(12) United States Patent
Puglia et al.

(10) Patent No.: US 11,313,969 B2
(45) Date of Patent: Apr. 26, 2022

(54) LIDAR HOMODYNE TRANSCEIVER USING PULSE-POSITION MODULATION

(71) Applicant: Veoneer US, Inc., Southfield, MI (US)

(72) Inventors: Kenneth Puglia, Hampton, NH (US); Bernard de Mersseman, Andover, MA (US)

(73) Assignee: VEONEER US, INC., Southfield, MI (US)

( * ) Notice: Subject to any disclaimer, the term of this patent is extended or adjusted under 35 U.S.C. 154(b) by 177 days.

(21) Appl. No.: 16/665,495

(22) Filed: Oct. 28, 2019

(65) Prior Publication Data

US 2021/0124050 A1   Apr. 29, 2021

(51) Int. Cl.
| | |
|---|---|
| G01S 17/34 | (2020.01) |
| H04B 10/63 | (2013.01) |
| G01S 7/4861 | (2020.01) |
| H04B 10/40 | (2013.01) |
| H04B 10/64 | (2013.01) |
| G01S 17/931 | (2020.01) |

(52) U.S. Cl.
CPC ............ *G01S 17/34* (2020.01); *G01S 7/4861* (2013.01); *G01S 17/931* (2020.01); *H04B 10/40* (2013.01); *H04B 10/63* (2013.01); *H04B 10/64* (2013.01)

(58) Field of Classification Search
None
See application file for complete search history.

(56) References Cited

U.S. PATENT DOCUMENTS

| | | | |
|---|---|---|---|
| 3,712,985 | A | 1/1973 | Swarner et al. |
| 3,898,656 | A | 8/1975 | Jensen |
| 4,125,864 | A | 11/1978 | Aughton |
| 4,184,154 | A | 1/1980 | Albanese et al. |
| 4,362,361 | A | 12/1982 | Campbell et al. |

(Continued)

FOREIGN PATENT DOCUMENTS

| | | |
|---|---|---|
| AT | 509180 B1 | 1/2016 |
| DE | 19757840 C1 | 9/1999 |

(Continued)

OTHER PUBLICATIONS

International Search Report and Written Opinion for International Application No. PCT/US2020/064474, dated Apr. 1, 2021.

(Continued)

*Primary Examiner* — Darren E Wolf
(74) *Attorney, Agent, or Firm* — Burns & Levinson LLP; Steven M. Mills

(57) ABSTRACT

A LiDAR system includes an optical source for generating a continuous wave (CW) optical signal. A control processor generates a pulse-position modulation (PPM) signal, and an amplitude modulation (AM) modulator generates a pulse-position amplitude-modulated optical signal, which is transmitted through a transmit optical element into a region. A receive optical element receives reflected versions of the pulse-position amplitude-modulated optical signal reflected from at least one target object in the region. An optical detector generates a first baseband signal. A signal processor receives the first baseband signal and processes the first baseband signal to generate an indication related to a target object in the region.

18 Claims, 12 Drawing Sheets

(56) References Cited

U.S. PATENT DOCUMENTS

| | | | |
|---|---|---|---|
| 4,439,766 A | 3/1984 | Kobayashi et al. | |
| 4,765,715 A | 8/1988 | Matsudaira et al. | |
| 4,957,362 A | 9/1990 | Peterson | |
| 5,200,606 A | 4/1993 | Krasutsky et al. | |
| 5,210,586 A | 5/1993 | Grage et al. | |
| 5,274,379 A | 12/1993 | Carbonneau et al. | |
| 5,428,215 A | 6/1995 | Dubois et al. | |
| 5,604,695 A | 2/1997 | Cantin et al. | |
| 5,793,491 A | 8/1998 | Wangler et al. | |
| 5,889,490 A | 3/1999 | Wachter et al. | |
| 5,966,226 A | 10/1999 | Gerber | |
| 6,078,395 A | 6/2000 | Jourdain et al. | |
| 6,122,222 A | 9/2000 | Hossack | |
| 6,292,285 B1 | 9/2001 | Wang et al. | |
| 6,384,770 B1 | 5/2002 | De Gouy | |
| 6,437,854 B2 | 8/2002 | Hahlweg | |
| 6,556,282 B2 | 4/2003 | Jamieson et al. | |
| 6,559,932 B1 | 5/2003 | Halmos | |
| 7,202,941 B2 | 4/2007 | Munro | |
| 7,227,116 B2 | 6/2007 | Gleckler | |
| 7,272,271 B2 | 9/2007 | Kaplan et al. | |
| 7,440,084 B2 | 10/2008 | Kane | |
| 7,483,600 B2 | 1/2009 | Achiam et al. | |
| 7,489,865 B2 | 2/2009 | Varshneya et al. | |
| 7,544,945 B2 | 6/2009 | Tan et al. | |
| 7,570,347 B2 | 8/2009 | Ruff et al. | |
| 7,675,610 B2 | 3/2010 | Redman et al. | |
| 7,832,762 B2 | 11/2010 | Breed | |
| 8,044,999 B2 | 10/2011 | Mullen et al. | |
| 8,050,863 B2 | 11/2011 | Trepagnier et al. | |
| 8,134,637 B2 | 3/2012 | Rossbach et al. | |
| 8,223,215 B2 | 7/2012 | Oggier et al. | |
| 8,363,511 B2 | 1/2013 | Frank et al. | |
| 8,508,723 B2 | 8/2013 | Chang et al. | |
| 8,629,975 B1 | 1/2014 | Dierking et al. | |
| 8,742,325 B1 | 6/2014 | Droz et al. | |
| 8,836,761 B2 | 9/2014 | Wang et al. | |
| 8,836,922 B1 | 9/2014 | Pennecot et al. | |
| 8,879,050 B2 | 11/2014 | Ko | |
| 9,007,569 B2 | 4/2015 | Amzajerdian et al. | |
| 9,063,549 B1 | 6/2015 | Pennecot et al. | |
| 9,086,273 B1 | 7/2015 | Gruver et al. | |
| 9,090,213 B2 | 7/2015 | Lawlor et al. | |
| 9,097,646 B1 | 8/2015 | Campbell et al. | |
| 9,140,792 B2 | 9/2015 | Zeng | |
| 9,157,790 B2 | 10/2015 | Shpunt et al. | |
| 9,267,787 B2 | 2/2016 | Shpunt et al. | |
| 9,285,477 B1 | 3/2016 | Smith et al. | |
| 9,575,162 B2 | 2/2017 | Owechko | |
| 9,618,742 B1 | 4/2017 | Droz et al. | |
| 9,651,417 B2 | 5/2017 | Shpunt et al. | |
| 9,658,322 B2 | 5/2017 | Lewis | |
| 9,696,427 B2 | 7/2017 | Wilson et al. | |
| 9,711,493 B2 | 7/2017 | Lin | |
| 9,753,351 B2 | 9/2017 | Eldada | |
| 9,823,351 B2 | 11/2017 | Haslim et al. | |
| 9,857,472 B2 | 1/2018 | Mheen et al. | |
| 9,869,754 B1 | 1/2018 | Campbell et al. | |
| 10,018,725 B2 | 7/2018 | Liu | |
| 10,018,726 B2 | 7/2018 | Hall et al. | |
| 10,024,655 B2 | 7/2018 | Raguin et al. | |
| 10,078,133 B2 | 9/2018 | Dussan | |
| 10,088,557 B2 | 10/2018 | Yeun | |
| 10,148,060 B2 | 12/2018 | Hong et al. | |
| 10,175,360 B2 | 1/2019 | Zweigle et al. | |
| 10,183,541 B2 | 1/2019 | Van Den Bossche et al. | |
| 10,411,524 B2 | 9/2019 | Widmer et al. | |
| 10,416,292 B2 | 9/2019 | de Mersseman et al. | |
| 10,473,767 B2 | 11/2019 | Xiang et al. | |
| 10,473,784 B2 | 11/2019 | Puglia | |
| 10,473,943 B1 | 11/2019 | Hughes | |
| 10,557,923 B2 | 2/2020 | Watnik et al. | |
| 10,558,044 B2 | 2/2020 | Pan | |
| 10,564,268 B2 | 2/2020 | Turbide et al. | |
| 10,578,724 B2 | 3/2020 | Droz et al. | |
| 10,678,117 B2 | 6/2020 | Shin et al. | |
| 10,775,508 B1 | 9/2020 | Rezk et al. | |
| 2001/0052872 A1 | 12/2001 | Hahlweg | |
| 2003/0043363 A1 | 3/2003 | Jamieson et al. | |
| 2004/0028418 A1 | 2/2004 | Kaplan et al. | |
| 2004/0031906 A1 | 2/2004 | Glecker | |
| 2004/0135992 A1* | 7/2004 | Munro | G01S 17/10 356/4.01 |
| 2004/0155249 A1 | 8/2004 | Narui et al. | |
| 2005/0219506 A1 | 10/2005 | Okuda et al. | |
| 2006/0221250 A1 | 10/2006 | Rossbach et al. | |
| 2006/0232052 A1 | 10/2006 | Breed | |
| 2006/0239312 A1 | 10/2006 | Kewitsch et al. | |
| 2007/0140613 A1 | 6/2007 | Achiam et al. | |
| 2007/0181810 A1 | 8/2007 | Tan et al. | |
| 2007/0211786 A1* | 9/2007 | Shattil | H04J 13/00 375/141 |
| 2007/0219720 A1 | 9/2007 | Trepagnier et al. | |
| 2008/0088499 A1 | 4/2008 | Bonthron et al. | |
| 2008/0095121 A1* | 4/2008 | Shattil | H04L 27/2602 370/335 |
| 2008/0100510 A1 | 5/2008 | Bonthron | |
| 2008/0219584 A1 | 9/2008 | Mullen et al. | |
| 2008/0246944 A1 | 10/2008 | Redman et al. | |
| 2009/0002680 A1 | 1/2009 | Ruff et al. | |
| 2009/0010644 A1 | 1/2009 | Varshneya et al. | |
| 2009/0190007 A1 | 7/2009 | Oggier et al. | |
| 2009/0251361 A1 | 10/2009 | Bensley | |
| 2010/0027602 A1* | 2/2010 | Abshire | H04L 25/4902 375/224 |
| 2010/0128109 A1 | 5/2010 | Banks | |
| 2010/0157280 A1 | 6/2010 | Kusevic et al. | |
| 2010/0182874 A1 | 7/2010 | Frank et al. | |
| 2012/0075422 A1 | 3/2012 | Wang et al. | |
| 2012/0182540 A1 | 7/2012 | Suzuki | |
| 2012/0206712 A1 | 8/2012 | Chang et al. | |
| 2012/0236379 A1 | 9/2012 | da Silva et al. | |
| 2012/0310516 A1 | 12/2012 | Zeng | |
| 2012/0310519 A1 | 12/2012 | Lawlor et al. | |
| 2013/0088726 A1 | 4/2013 | Goyal et al. | |
| 2013/0093584 A1 | 4/2013 | Schumacher | |
| 2013/0120760 A1 | 5/2013 | Raguin et al. | |
| 2013/0166113 A1* | 6/2013 | Dakin | G01S 7/4818 701/10 |
| 2013/0206967 A1 | 8/2013 | Shpunt et al. | |
| 2013/0207970 A1 | 8/2013 | Shpunt et al. | |
| 2013/0222786 A1* | 8/2013 | Hanson | G01P 5/26 356/28 |
| 2013/0250276 A1 | 9/2013 | Chang et al. | |
| 2014/0036252 A1 | 2/2014 | Amzajerdian et al. | |
| 2014/0049609 A1 | 2/2014 | Wilson et al. | |
| 2014/0152975 A1 | 6/2014 | Ko | |
| 2014/0168631 A1 | 6/2014 | Haslim et al. | |
| 2014/0233942 A1* | 8/2014 | Kanter | G01S 17/26 398/25 |
| 2014/0313519 A1 | 10/2014 | Shpunt et al. | |
| 2015/0009485 A1 | 1/2015 | Mheen et al. | |
| 2015/0055117 A1 | 2/2015 | Pennecot et al. | |
| 2015/0234308 A1 | 8/2015 | Lim et al. | |
| 2015/0260843 A1 | 9/2015 | Lewis | |
| 2015/0301162 A1 | 10/2015 | Kim | |
| 2015/0371074 A1 | 12/2015 | Lin | |
| 2015/0378011 A1 | 12/2015 | Owechko | |
| 2016/0047895 A1 | 2/2016 | Dussan | |
| 2016/0047896 A1* | 2/2016 | Dussan | G01S 7/4817 356/4.01 |
| 2016/0047903 A1 | 2/2016 | Dussan | |
| 2016/0138944 A1 | 5/2016 | Lee et al. | |
| 2016/0178749 A1 | 6/2016 | Lin et al. | |
| 2016/0200161 A1 | 7/2016 | Van Den Bossche et al. | |
| 2016/0245902 A1 | 8/2016 | Watnik et al. | |
| 2016/0280229 A1 | 9/2016 | Kasahara | |
| 2016/0291160 A1 | 10/2016 | Zweigle et al. | |
| 2016/0357187 A1 | 12/2016 | Ansari | |
| 2016/0363669 A1 | 12/2016 | Liu | |
| 2016/0380488 A1 | 12/2016 | Widmer et al. | |
| 2017/0023678 A1 | 1/2017 | Pink et al. | |
| 2017/0090013 A1 | 3/2017 | Paradie et al. | |

(56) References Cited

U.S. PATENT DOCUMENTS

| | | | |
|---|---|---|---|
| 2017/0102457 A1 | 4/2017 | Li | |
| 2017/0199273 A1 | 7/2017 | Morikawa et al. | |
| 2017/0219696 A1 | 8/2017 | Hayakawa et al. | |
| 2017/0269215 A1 | 9/2017 | Hall et al. | |
| 2017/0270381 A1 | 9/2017 | Itoh et al. | |
| 2017/0285346 A1 | 10/2017 | Pan | |
| 2017/0307736 A1 | 10/2017 | Donovan | |
| 2017/0307737 A1 | 10/2017 | Ishikawa et al. | |
| 2017/0329010 A1* | 11/2017 | Warke | G01S 7/487 |
| 2017/0329011 A1* | 11/2017 | Warke | G01S 7/484 |
| 2018/0052378 A1 | 2/2018 | Shin et al. | |
| 2018/0113193 A1 | 4/2018 | Huemer | |
| 2018/0128903 A1 | 5/2018 | Chang | |
| 2018/0143309 A1 | 5/2018 | Pennecot et al. | |
| 2018/0180718 A1 | 6/2018 | Lin | |
| 2018/0224529 A1 | 8/2018 | Wolf et al. | |
| 2018/0241477 A1 | 8/2018 | Turbide et al. | |
| 2018/0284237 A1 | 10/2018 | Campbell | |
| 2018/0284282 A1 | 10/2018 | Hong et al. | |
| 2018/0306913 A1 | 10/2018 | Bartels | |
| 2018/0341009 A1 | 11/2018 | Niclass et al. | |
| 2018/0364334 A1 | 12/2018 | Xiang et al. | |
| 2018/0372870 A1 | 12/2018 | Puglia | |
| 2019/0101644 A1 | 4/2019 | DeMersseman et al. | |
| 2019/0129009 A1 | 5/2019 | Eichenholz et al. | |
| 2019/0139951 A1 | 5/2019 | T'ng et al. | |
| 2019/0146060 A1 | 5/2019 | Qiu et al. | |
| 2019/0195990 A1 | 6/2019 | Shand | |
| 2019/0235064 A1 | 8/2019 | Droz et al. | |
| 2020/0081129 A1 | 3/2020 | de Mersseman | |
| 2020/0088847 A1 | 3/2020 | DeMersseman et al. | |
| 2020/0341120 A1 | 10/2020 | Ahn | |
| 2020/0341121 A1 | 10/2020 | Ahn | |

FOREIGN PATENT DOCUMENTS

| | | |
|---|---|---|
| DE | 102004033944 A | 2/2006 |
| DE | 102006031114 B4 | 7/2008 |
| DE | 102008045387 A1 | 3/2010 |
| DE | 102014218957 A1 | 3/2016 |
| DE | 102015217908 A | 3/2017 |
| EP | 0112188 B1 | 6/1987 |
| EP | 0578129 A2 | 1/1994 |
| EP | 2696166 A3 | 12/2014 |
| EP | 2824418 A1 | 1/2015 |
| EP | 3203259 A1 | 8/2017 |
| EP | 3457080 A1 | 3/2019 |
| EP | 3578129 A1 | 12/2019 |
| EP | 3147685 B1 | 1/2020 |
| WO | 1994019705 | 9/1994 |
| WO | 2008008970 A3 | 1/2008 |
| WO | 2015014556 A3 | 2/2015 |
| WO | 2016072483 A1 | 5/2016 |
| WO | 2016097409 A3 | 6/2016 |
| WO | 2016204139 A1 | 12/2016 |
| WO | 2019050643 A1 | 3/2019 |
| WO | 2019099166 A1 | 5/2019 |

OTHER PUBLICATIONS

International Search Report and Written Opinion for International Application No. PCT/US2018/057676, dated Jan. 23, 2019.
International Search Report and Written Opinion for International Application No. PCT/US2018/052849, dated May 6, 2019.
International Search Report and Written Opinion for International Application No. PCT/US2019/046800, dated Nov. 25, 2019.
Kasturi et al., UAV-Borne LiDAR with MEMS Mirror Based Scanning Capability; SPIE Defense and Commercial Sensing Conference 2016, Baltimore, MD; 10 pages, 2016.
Internet URL: https://www.continental-automotive.com/en-gl/Passenger-Cars/Chassis-Safety/Advanced-Driver-Assistance-Systems/Cameras [retrieved on Dec. 20, 2018].
Internet URL: https://www.continental-automotive.com/en-gl/Passenger-Cars/Chassis-Safety/Advanced-Driver-Assistance-Systems/Cameras/Multi-Function-Camera-with-Lidar [retrieved on Dec. 20, 2018].
Hi-Res 3d Flash LIDAR will Supplement Continental's Existing Portfolio for Automated Driving [online], Press Release, \larch 3, 2016, [retrieved on Dec. 20, 2018]. Retrieved from the Internet URL: https://www.continental-corporation.com/en/press/press-releases/hi-res-3d-flash-lidar-will-supplement-continental-s-existing-portfolio-for-automated-driving-15758.
A milestone for laser sensors in self-driving cars [online], Trade Press, Jul. 11, 2016, [retrieved on Dec. 19, 2018]. Retrieved from the Internet URL: https://www.osram.com/os/press/press-releases/a_milestone_for_lasersensors_in_self-driving_carsjsp.
Hewlett-Packard Application Note 77-4, Swept-Frequency Group Delay Measurements, Hewlett-Packard Co., September, 7 pages, 1968.
Kravitz et al., High-Resolution Low-Sidelobe Laser Ranging Based on Incoherent Pulse Compression, IEEE Jhotonic,s Technology Letters, vol. 24, No. 23, pp. 2119-2121, 2012.
Journet et al., A Low-Cost Laser Range Finder Based on an FMCW-like Method, IEEE Transactions on nstrumentation and Measurement, vol. 49, No. 4, pp. 840-843, 2000.
Campbell et al., Advanced Sine Wave Modulation of Continuous Wave Laser System for Atmospheric CO2 Differential Absorption Measurements; NASA Langley Research Center, 32 pages, 2018.
Levanon et al., Non-coherent Pulse Compression-Aperiodic and Periodic Waveforms; The Institution of Engineering and Technology, 9 pages, 2015.
Peer et al., Compression Waveforms for Non-Coherent Radar, Tel Aviv University, 6 pages, 2018.
Li, Time-of-Flight Camera-An Introduction, Technical White Paper, SLOA190B, Texas Instruments, 10 pages, 2014.
Pierrottet et al., Linear FMCW Laser Radar for Precision Range and Vector Velocity Measurements, Coherent Applications, Inc., NASA Langley Research Center, 9 pages, 2018.
Kahn, Modulation and Detection Techniques for Optical Communication Systems, Stanford University, Department of Electrical Engineering, 3 pages, 2006.
Niclass et al., Development of Automotive LIDAR, Electronics and Communications in Japan, vol. 98, No. 5, 6 pages, 2015.
Su et al., 2-D FFT and Time-Frequency Analysis Techniques for Multi-Target Recognition of FMCW Radar Signal, Proceedings of the Asia-Pacific Microwave Conference 2011, pp. 1390-1393.
Wojtkiewicz et al., Two-Dimensional Signal Processing in FMCW Radars, Instytut Podstaw Elektroniki Politechnika Warszawska, Warszawa, 6 pages, 2018.
Winkler, Range Doppler Detection for Automotive FMCW Radars, Proceedings of the 4th European Radar Conference, Munich Germany, 4 pages, 2007.
Li et al., Investigation of Beam Steering Performances in Rotation Risley-Prism Scanner, Optics Express, vol. 24, No. 12, 11 pages, 2016.
THORLABS Application Note, Risley Prism Scanner, 33 pages, 2018.
Simpson et al., Intensity-Modulated, Stepped Frequency CW Lidar for Distributed Aerosol and Hard Target Measurements, Applied Optics, vol. 44, No. 33, pp. 7210-7217, 2005.
Skolnik, Introduction to Radar Systems, 3rd Edition, McGraw-Hill, New York, NY 2001, pp. 45-48.
Wang et al., Range-Doppler image processing in linear FMCW Radar and FPGA Based Real-Time Implementation, Journal of Communication and Computer, vol. 6, No. 4, 2009.
International Search Report and Written Opinion for International Application No. PCT/US2018/057727 dated Jan. 28, 2019.
International Search Report and Written Opinion for International Application No. PCT/US2018/052837 dated Jan. 24, 2019.
International Search Report and Written Opinion for International Application No. PCT/US2017/033263 dated Aug. 29, 2017.
International Search Report and Written Opinion for International Application No. PCT/US2018/048869 dated Nov. 8, 2018.
International Search Report and Written Opinion for International Application No. PCT/US2018/051281 dated Nov. 22, 2018.

(56) References Cited

OTHER PUBLICATIONS

International Search Report and Written Opinion for International Application No. PCT/US2018/054992 dated Dec. 11, 2018.
International Search Report and Written Opinion for International Application No. PCT/US2018/049038 dated Dec. 12, 2018.
International Search Report and Written Opinion for International Application No. PCT/US2017/033265 dated Sep. 1, 2017,.
International Search Report and Written Opinion for International Application No. PCT/US2017/033271 dated Sep. 1, 2017.
Invitation to Pay Additional Fees for International Application No. PCT/US2018/052849 dated Mar. 8, 2019.
http://www.advancedscientificconcepts.com/products/overview.html.
Roncat, Andreas, The Geometry of Airborne Laser Scanning in a Kinematical Framework, Oct. 19, 2016, www.researchgate.net/profile/Andreas_Roncat/publication/310843362_The_Geometry_ofAirborne_LaserScanningin_a_Kinematical_Frameworldinks/5839add708ae3a74b49ea03b1The-Geometry-of-Airbome-Laser-Scanning-in-a-Kinematical-Framework.pdf.
Church et al., "Evaluation of a steerable 3D laser scanner using a double Risley prism pair," SPIE Paper.
Luhmann, "A historical review on panorama photogrammetry," http://www.researchgate.net/publication/228766550.
International Search Report and Written Opinion for International Application No. PCT/US2020/039760, dated Sep. 18, 2020.
Communication from EP Application No. 18773034.6 dated Sep. 13, 2021.

\* cited by examiner

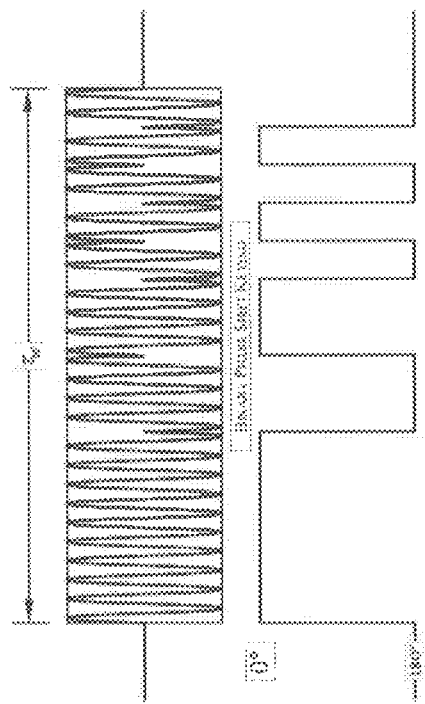
Fig. 1B
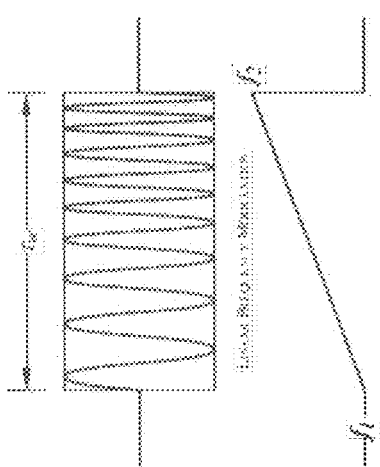
Fig. 1A
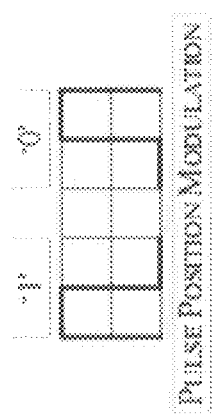
Fig. 2B
Fig. 2A

LIDAR HOMODYNE TRANSCEIVER USING PULSE-POSITION MODULATION

BACKGROUND

1. Technical Field

The present disclosure is related to LiDAR systems and, in particular, to a homodyne LiDAR system and method with pulse-code modulation (PCM) transmission, which can be used in an automotive or other motor vehicle application.

2. Discussion of Related Art

LiDAR is commonly referred to as an acronym for light detection and ranging, in the sense that LiDAR is commonly considered an optical analog to radar. In general, there are two types of LiDAR systems, namely, incoherent LiDAR and coherent LiDAR. Incoherent LiDAR, also commonly referred to as direct detection or direct energy detection LiDAR, primarily uses an amplitude measurement in light returns, while coherent LiDAR is better suited for phase-sensitive measurements or other more sophisticated transmitter waveform modulation techniques. Coherent systems generally use optical heterodyne or homodyne detection, which, being more sensitive than direct detection, allows them to operate at a much lower power and provide greater measurement accuracy and resolution.

SUMMARY

According to a first aspect, a LiDAR system is provided. The LiDAR system includes an optical source for generating a continuous wave (CW) optical signal; a control processor for generating a pulse-position modulation (PPM) signal; an amplitude modulation (AM) modulator for receiving the CW optical signal and the PPM signal and generating therefrom a pulse-position amplitude-modulated optical signal; a transmitter for transmitting the pulse-position amplitude-modulated optical signal through a transmit optical element into a region; a receive optical element for receiving reflected versions of the pulse-position amplitude-modulated optical signal reflected from at least one target object in the region; a first optical detector for receiving the CW optical signal from the optical source and a received version of the reflected versions of the pulse-position amplitude-modulated optical signal, and generating therefrom a first baseband signal; and a signal processor for receiving the first baseband signal and processing the first baseband signal to generate an indication related to the object.

In some exemplary embodiments, the LiDAR system is a homodyne LiDAR system. In other exemplary embodiments, the LiDAR system is a heterodyne LiDAR system.

In some exemplary embodiments, the first optical detector comprises a first mixer for generating the first baseband signal.

In some exemplary embodiments, the system further comprises a second optical detector for receiving the CW optical signal from the optical source and a received version of the reflected versions of the pulse-position amplitude-modulated optical signal, and generating therefrom a second baseband signal. In some exemplary embodiments, the second optical detector comprises a second mixer for generating the second baseband signal. In some exemplary embodiments, the first and second baseband signals are in quadrature. In some exemplary embodiments, the first optical detector generates an in-phase-channel voltage signal, and the second optical detector generates a quadrature-channel voltage signal. In some exemplary embodiments, at least one of the first and second optical detectors comprises a phase shifter for introducing a phase difference between the first and second baseband signals.

In some exemplary embodiments, the LiDAR system further comprises a first low-pass filter for filtering the in-phase-channel voltage signal to generate a filtered in-phase-channel voltage signal and a second low-pass filter for filtering the quadrature-channel voltage signal to generate a filtered quadrature-channel voltage signal. In some exemplary embodiments, the LiDAR system further comprises a first analog-to-digital converter (ADC) for converting the in-phase-channel voltage signal to a digital in-phase-channel voltage signal and a second ADC for converting the quadrature-channel voltage signal to a digital quadrature-channel voltage signal.

In some exemplary embodiments, the signal processor receives the first baseband signal and the second baseband signal and processes the first and second baseband signals to generate the indication related to the object. In some exemplary embodiments, the processor, in processing the first and second baseband signals to generate the indication related to the object, performs Doppler processing. In some exemplary embodiments, the processor, in processing the first and second baseband signals to generate the indication related to the object, performs correlation processing.

According to another aspect, a LiDAR method is provided. The LiDAR method includes: generating a continuous wave (CW) optical signal; generating a pulse-position modulation (PPM) signal; generating a pulse-position amplitude-modulated optical signal from the CW optical signal and the PPM signal; transmitting the pulse-position amplitude-modulated optical signal though a transmit optical element into a region; receiving reflected versions of the pulse-position amplitude-modulated optical signal reflected from at least one object in the region; mixing the CW optical signal from the optical source and the reflected versions of the pulse-position amplitude-modulated optical signal to generate therefrom a first baseband signal; and processing the first baseband signal to generate an indication related to the object.

In some exemplary embodiments, the LiDAR method is a homodyne LiDAR method. In other exemplary embodiments, the LiDAR method is a heterodyne LiDAR method.

In some exemplary embodiments, the LiDAR method further comprises mixing the CW optical signal from the optical source and the reflected versions of the pulse-position amplitude-modulated optical signal to generate therefrom a second baseband signal and processing the first and second baseband signals to generate the indication related to the object. In some exemplary embodiments, the first and second baseband signals are in quadrature. In some exemplary embodiments, the LiDAR method further comprises performing optical detection to generate an in-phase-channel voltage signal from the first baseband signal and a quadrature-channel voltage signal from the second baseband signal. In some exemplary embodiments, the LiDAR method further comprises performing phase shifting to introduce a phase difference between the first and second baseband signals.

In some exemplary embodiments, the LiDAR method further comprises low-pass filtering the in-phase-channel voltage signal to generate a filtered in-phase-channel voltage signal and low-pass filtering the quadrature-channel voltage signal to generate a filtered quadrature-channel voltage signal. In some exemplary embodiments, the LiDAR method further comprises converting the in-phase-channel voltage signal to a digital in-phase-channel voltage signal and converting the quadrature-channel voltage signal to a digital quadrature-channel voltage signal.

In some exemplary embodiments, processing the first and second baseband signals to generate the indication related to the object comprises performing Doppler processing on the digital in-phase-channel voltage signal and the digital quadrature-channel voltage signal.

In some exemplary embodiments, processing the first and second baseband signals to generate the indication related to the object comprises performing correlation processing on the digital in-phase-channel voltage signal and the digital quadrature-channel voltage signal.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 1A includes a schematic time waveform diagram illustrating a linear frequency modulation (LFM) pulse compression transmit waveform.

FIG. 1B includes a schematic time waveform diagram illustrating a binary phase shift keying (BPSK) pulse compression transmit waveform.

FIG. 2A includes a schematic waveform diagram illustrating pulse position modulation (PPM) encoding, which can be applied to a transmit waveform, according to some exemplary embodiments.

FIG. 2B includes a schematic waveform diagram illustrating non-coherent pulse compression (NCPC) according to some exemplary embodiments, using a length-13 Barker Code encoding on the transmit waveform.

FIG. 8 includes a schematic diagram illustrating the mathematical structure of the sliding correlator, according to some exemplary embodiments.

DETAILED DESCRIPTION

Figure 3:
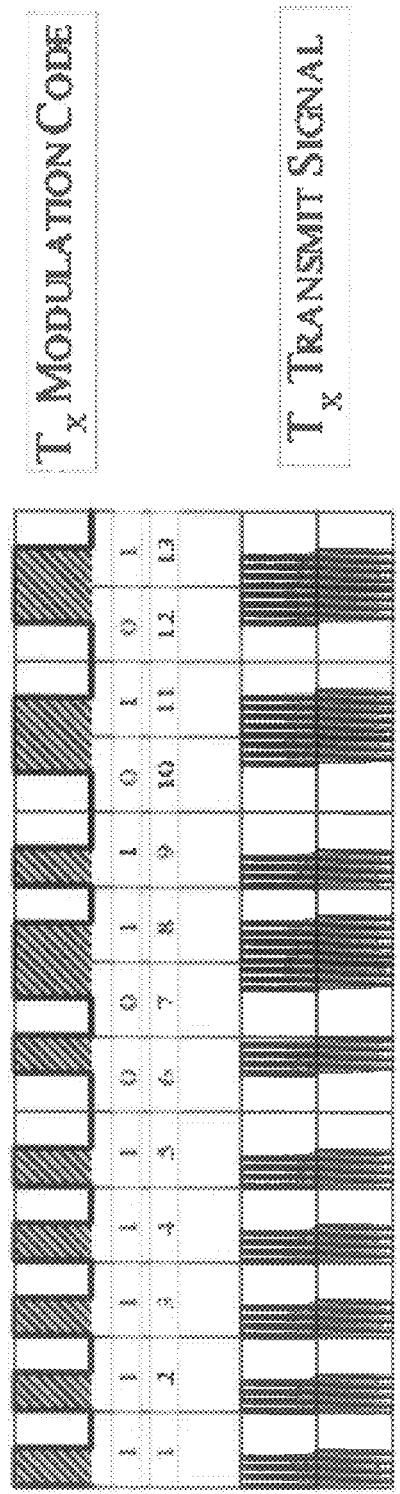
FIG. 3 includes two schematic waveform diagrams illustrating a transmit waveform, according to some exemplary embodiments.

According to the present disclosure, a PCM LiDAR transceiver can utilize a variety of codes and code lengths to address the operational environment. The technique of non-coherent pulse compression (NCPC) is expanded to application in a coherent, i.e., homodyne, LiDAR architecture. According to the present disclosure, the PCM homodyne LiDAR transceiver is described in conjunction with data acquisition for range and Doppler measurement techniques. Signal processing gain is achieved via code length and correlation receiver techniques. Also, PCM LiDAR using NCPC requires only amplitude modulation (AM) pulse modulation for implementation and enables the signal processing gain benefits realized by the embodiments of the present disclosure. Furthermore, a significant advantage of the PCM homodyne LiDAR system architecture and the use of NCPC according to the present disclosure is the reduction of the laser transmitter spectral quality required for coherent pulse compression using direct FM or PM modulation.

Unlike a direct detection LiDAR transceiver, a homodyne LiDAR transceiver according to the present disclosure utilizes frequency translation or mixing as the first stage of the receiver to transfer the return signal from a bandpass signal at carrier frequency $f_o$ to a baseband signal for signal processing and measurement data extraction. It should be noted that NCPC is also applicable to direct detection LiDAR, but without the ability to determine Doppler frequency. To a moderate extent, the homodyne LiDAR transceiver of the disclosure increases the complexity of the system architecture; however, the receiver detection sensitivity is significantly improved, which reduces the transmit power, extends the operational range and increases range measurement accuracy.

According to exemplary embodiments, some transmit modulation waveforms require an additional level of complexity, which requires extension of the laser coherence time, also referred to as coherence length, which is the time over which a propagating wave (especially a laser or maser beam) may be considered coherent. That is, it is the time interval within which its phase is, on average, predictable. Specifically, the linear frequency-modulated continuous-wave (FMCW) waveform requires a highly linear change in frequency versus time as well as precise frequency deviation to insure range measurement accuracy and resolution. In addition, laser frequency-modulated noise and modulation bandwidth limitations further reduce the available signal-to-noise ratio and thereby degrade range measurement performance. An example of the level of complexity required to achieve linear frequency modulation and reduce laser phase noise to acceptable levels is the utilization of an electro-optical phase-locked loop (PLL). However, due to cost, complexity and operational environmental conditions, implementation of an electro-optical PLL is not compatible with automotive equipment requirements. It is noted that the PCM homodyne LiDAR of the present disclosure can be limited by the laser coherence time or length.

Non-coherent pulse compression (NCPC) waveforms for direct detection LiDAR systems, offer the opportunity to achieve comparable range measurement capability to linear FMCW, and do not require the spectral quality and FM modulation parameters of linear FMCW coherent LiDAR transceivers. According to the present disclosure, NCPC is implemented within coherent LiDAR transceivers, in particular, homodyne LiDAR transceivers. It is noted that the NCPC technique is also applicable to heterodyne LiDAR transceivers, although the present disclosure emphasizes application of the technique to homodyne LiDAR transceivers. The PCM homodyne LiDAR transceiver of the disclosure is described herein in conjunction with data acquisition for range and Doppler measurement. Signal processing gain is achieved via code length and correlation receiver techniques.

Pulse compression is a term which describes frequency modulation (FM) or phase modulation (PM) within the transmit pulse of radar systems for the purpose of increasing the transmit signal spectrum, thereby improving the range measurement resolution. In addition, pulse compression allows a wider pulse to be utilized for the purpose of increasing the average transmit power while maintaining range measurement resolution. The two most common techniques for pulse compression implementation are linear frequency modulation (LFM) and coded binary phase shift keying (BPSK).

Pulse compression is a signal processing technique commonly used by radar, sonar and echography to increase the range resolution as well as the signal-to-noise ratio. Pulse compression is achieved by transmitting a pulse, within which a parameter, i.e., amplitude, frequency or phase, of the transmitted pulsed signal, is subject to intra-pulse modulation and, upon receive correlation, a narrower pulse is produced. A quantitative measurement term for pulse compression implementation is the pulse compression ratio (PCR), which is defined as the increase in range resolution over the un-modulated pulse and is often expressed as the time-bandwidth product. The pulse compression ratio, or PCR, may be mathematically defined by the equation:

$$PCR = \tau_w \cdot B_{tx}$$

where, $\tau_w$ is the modulated pulse width,
and, $B_{tx}$ is the spectral width of the modulated pulse.
For the linear FM waveform, the pulse compression ratio may be written:

$$PCR_{LFM} = \Delta T \cdot \Delta F$$

where, $\Delta T$ is the pulse width,
and, $\Delta F$ is the frequency deviation.

FIGS. 1A and 1B are schematic time waveform diagrams illustrating LFM (FIG. 1A) and BPSK (FIG. 1B) pulse compression transmit waveforms. Referring to FIG. 1A, in LFM, the frequency of the transmit waveform varies along a linear ramp from a first frequency $f_1$ to a second frequency $f_2$ over a pulse period $\tau_\omega$. In the BPSK diagram of FIG. 1B, either 0° or 180° phase shift is imposed on the transmit waveform, depending on a desired encoding, for example a length-13 Barker code.

Although the term "coherent" is not typically specifically employed in the description of pulse compression, it is clear that a coherent signal must be utilized to perform the de-chirp function in the case of the LFM waveform, and phase demodulation in the case of the BPSK waveform. The "non-coherent" as used herein means that a coherent de-chirp or demodulation signal is not required to perform the pulse compression function. Pulse compression is achieved via correlation/convolution within the receiver using a stored replica of the modulation code. Pulse compression, as performed within the receiver, may be implemented using analog or digital methods. In either case, a "sliding" correlator is used to perform a range bin search of the return signal. The range bin search includes multiplication of the received signal by discrete or continuous time increments of the modulation code, followed by integration, i.e., summation, of the multiplied signal components.

FIG. 2A is a schematic waveform diagram illustrating pulse position modulation (PPM) encoding, which can be applied to a transmit waveform. FIG. 2B is a schematic waveform diagram illustrating NCPC according to the present disclosure, using a length-13 Barker Code encoding on the transmit waveform. To describe and illustrate the NCPC technique of the disclosure and the details of coherent and non-coherent pulse compression, reference is made to FIGS. 2A and 2B, wherein the length-13 Barker code is implemented in a pulse position modulation (PPM) format.

According to the present disclosure, the NCPC technique is implemented in a different format than "coherent" pulse compression and utilizes amplitude modulation (AM) pulse modulation as opposed to frequency modulation (FM) or phase modulation (PM). Notwithstanding the implementation method, the NCPC technique achieves similar performance advantages as the classical method and eliminates the complexities related to modulation, spectral quality within the transmitter, and significantly, coherent architectures within the receiver. FIG. 3 includes two schematic waveform diagrams illustrating the transmit waveform according to the exemplary embodiments. The top curve of FIG. 3 illustrates the transmit (Tx) modulation code used to amplitude modulation the transmit signal to encode the signal with the desired coding, e.g., the length-13 Barker code. The lower curve illustrates the amplitude modulated transmit (Tx) signal, which has been amplitude modulated according to the Tx modulation code of the upper curve. It is noted that the PPM increases the code length by a factor of two. The normal Barker Code of length 13 employs two-state phase modulation (BPSK) of 0° or 180°. According to the present disclosure, PPM is carried out using the length 13 Barker Code as an example, with PPM for each of the Barker Code states being as illustrated in FIGS. 1, 2A and 2B. The left position is defined as a binary "1", and the right position is defined as a binary "0".

Figure 4:
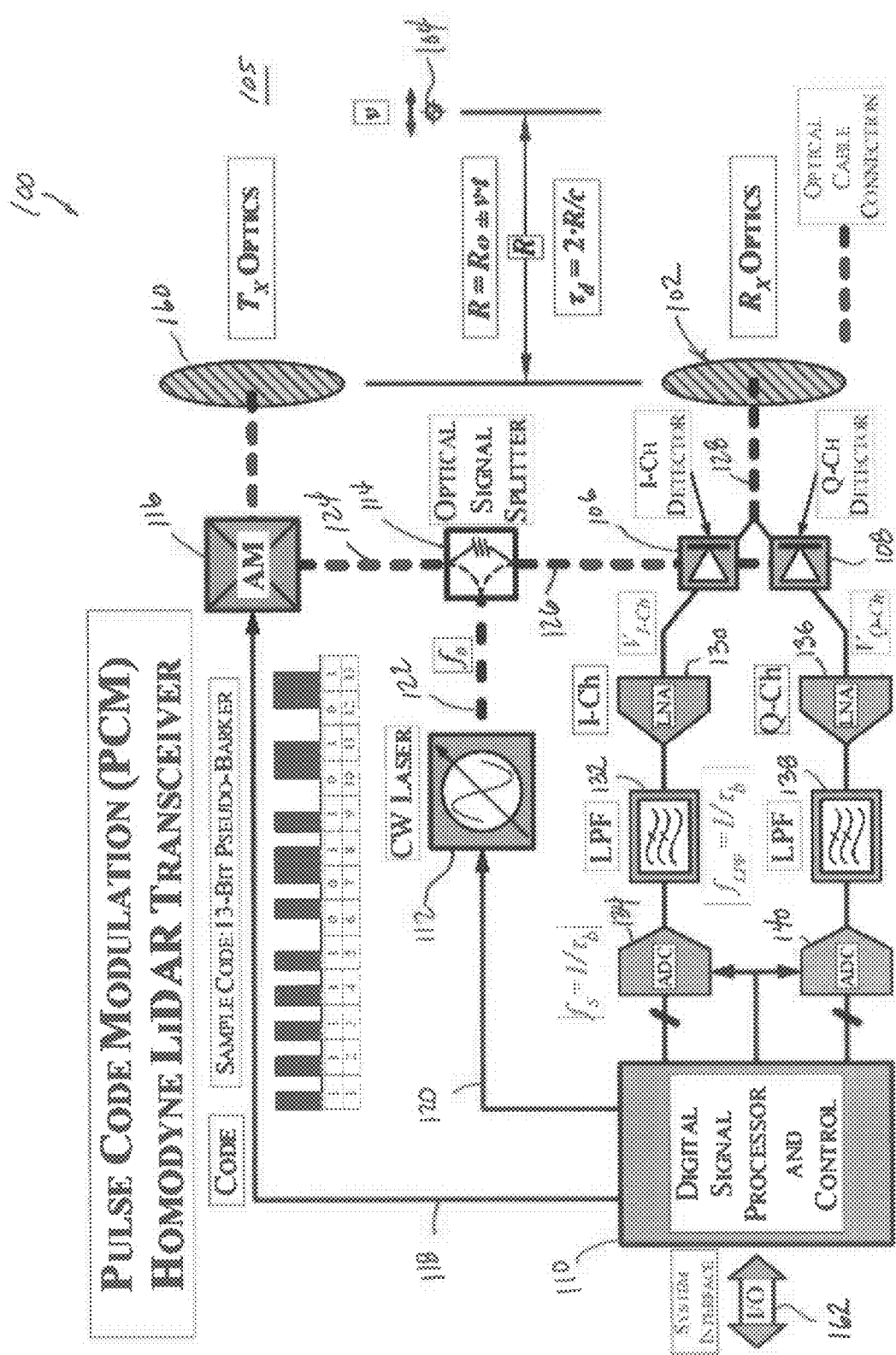
FIG. 4 includes a schematic functional block diagram of a pulse-code modulation (PCM) homodyne LiDAR transceiver, according to some exemplary embodiments.

FIG. 4 includes a schematic functional block diagram of a PCM homodyne LiDAR transceiver 100, according to some exemplary embodiments. Referring to FIG. 4, LiDAR transceiver 100 includes a receive optical element or receive optics 102 at which optical energy, including optical returns from one or more target objects 104, are received from region 105 being observed by the LiDAR system using transceiver 100. Receive optics 102 can include, for example, one or more lenses and/or other optical elements used in such transceivers 100. The optical energy is received from receive optics 102 via optical conductor or line, e.g., optical cable, 128 at in-phase channel (I-Ch) detector 106 and quadrature channel (Q-Ch) detector 108. Under control of digital signal processor (DSP) and control system 110, via control line 120, continuous-wave (CW) laser 112 generates an optical carrier signal at nominal frequency $f_0$ and applies the optical carrier signal along optical conductor or line, e.g., optical cable, 122 to optical signal splitter 114. Optical signal splitter 114 applies one of its split signal outputs to amplitude modulator 116 along optical conductor or line, e.g., optical cable, 124, and applies another split signal output to I-Ch detector 106 and Q-Ch detector 108 along optical conductor line, e.g., optical cable, 126.

In the in-phase channel, I-Ch detector 106 performs optical detection with an optical detector and homodyne conversion by mixing with a mixer the received optical signal via optical line 128 with the received optical signal from optical splitter 114 on line 126 at frequency $f_0$ to generate an in-phase voltage signal, $V_{I-Ch}$, and outputs signal $V_{I-Ch}$ to in-phase channel low-noise amplifier (LNA) 132. LNA 132 amplifies the signal and applies the amplified signal to low-pass filter (LPF) 132, which filters the amplified signal using a low-pass cut-off frequency $f_{LPF}=1/\tau_b$, where $\tau_b$ is defined as the bit chip time, i.e., the pulse width. The resulting filtered signal is applied to DSP and control system 110, which processes the received signal according to the present disclosure. LPF 132 reduces the noise bandwidth, but allows the signal energy to pass, thereby improving signal-to-noise ratio (SNR).

Similarly, in the quadrature channel, Q-Ch detector 108 performs optical detection with an optical detector and homodyne conversion by mixing with a mixer the received optical signal via optical line 128 with the received optical signal from optical splitter 114 on line 126 at frequency $f_0$ to generate a quadrature voltage signal, $V_{Q-Ch}$, and outputs signal $V_{Q-Ch}$ to quadrature channel low-noise amplifier (LNA) 136. LNA 136 amplifies the signal and applies the amplified signal to low-pass filter (LPF) 138, which filters the amplified signal using a low-pass cut-off frequency $f_{LPF}=1/\tau_b$. The resulting filtered signal is applied to DSP and control system 110, which processes the received signal according to the present disclosure. One or both of optical detectors 106, 108 includes an optical phase shifter which phase shifts one or both of the received optical signal on line 128 to provide the necessary phase shift to develop the in-phase and quadrature channel signals $V_{I-Ch}$ and $V_{Q-Ch}$. DSP and control system 110 also provides an input/output interface 162, for interfacing with external elements, such as control systems, processing systems, user input/output systems, and other such systems.

The optical signal used to illuminate target objects, such as target object 104, in region 105 being observed by the LiDAR system using LiDAR transceiver 100, is transmitted into region 105 via transmit optical element or transmit optics 160, which can include one or more lenses and/or other optical elements used in such transceivers 100. The optical signal being transmitted is amplitude modulated by amplitude modulator 116, which applies a pulse-position amplitude modulation to the optical signal received on optical line 124 from optical signal splitter 114, under the control of one or more control signals generated by DSP and control module 110. According to the present disclosure, in some exemplary embodiments, pulse-position modulation is used to encode the transmitted signal with a code, which in some exemplary embodiments can be a 13-bit pseudo-Barker code, as illustrated in FIG. 4. As referred to herein, according to the present disclosure, a "pseudo" Barker Code is a derivative of the normal Barker Code, in which a single bit of the normal Barker Code is replaced with a binary pulse-position-modulated signal. FIGS. 1B and 2B illustrate the signal relationships.

According to exemplary embodiments, the quadrature detection precedes analog-to-digital conversion. The quadrature detector recovers the pulse modulation envelope associated with the low-frequency pulse modulation. The data samples are subsequently processed via spectral resolution or other means of each range bin data set. The spectral resolution approach used reduces the detection bandwidth and effectively integrates the energy of the range bin sample set.

FIG. 4 illustrates the system block diagram of a pulse code modulation (PCM) homodyne LiDAR transceiver with NCPC capability, according to the present disclosure. The PCM transmit waveform is implemented with AM pulse modulation of the CW laser signal. The PCM waveform is synthesized within the DSP and control system 110, i.e., the digital signal processor (DSP), and applied to the AM modulator, i.e., amplitude modulator 116. For illustrative purposes, a length 13 pseudo-Barker code is shown. A longer code length provides increased processing gain and lower sidelobes. In this illustrative exemplary embodiment, each burst of the transmit signal is comprised of 26 discrete time segments with binary transmit power levels of "1", which represents a transmit power level, or "0", which represents no transmit power. The modulation format is similar to that associated with On-Off Keying, or OOK. It is noted that transmit Tx pulses are unipolar, and correlation is bipolar. Tx modulation code generation may be accomplished using standard techniques, i.e., shift register, arbitrary waveform generator (AWG), or direct digital synthesis (DDS).

Continuing to refer to FIG. 4, the PCM transmit signal is focused on a spatial region of interest 105 using transmit optics 160; and a similar spatial region of interest 105 is achieved using receive optics 102. Analogous to radar parlance, transmit optics 160 and receive optics 102 perform the respective radar antenna functions. The transmit PCM signal is incident on a target object 104 at range R; the incident signal is scattered in accordance with the physical attributes and unique geometry of target object 104 at the operating wavelength; part of the scattered signal is reflected toward receive optics 102, where the signal is incident on diodes of I-Ch and Q-Ch detectors 106 and 108, respectively.

Continuing to refer to FIG. 4, the received signal is homodyned, or mixed, with the CW laser signal from optical signal splitter 114, which acts as a local oscillator. Upon mixing, phase coherence between the PCM transmit signal and the local oscillator engenders amplitude and phase demodulation of the PCM code at the outputs of I-Ch detector 106 and Q-Ch detector 108 in accordance with the detector output equations for the I-channel and Q-channel voltage pulses:

$$V_{I-Ch} = \alpha\cos\left[2\pi\left(\frac{2R}{\lambda_0}\right)\right] \text{ and } V_{Q-Ch} = \alpha\sin\left[2\pi\left(\frac{2R}{\lambda_0}\right)\right]$$

where, R is the range to the object, $\lambda_0$ is the operating wavelength
and $\alpha$ is an attenuation factor due to transmission and reflection losses.
It is recognized that:

$$R = R_0 + v \cdot t$$

where $R_0$ is the static range and v is the normal component of closing velocity. Upon substitution and arrangement of the constituent terms, one may write:

$$V_{I-Ch} = \alpha\cos\lfloor 2\pi f_d t + \phi_0 \rfloor \text{ and}$$

$$V_{Q-Ch} = \alpha\sin\lfloor 2\pi f_d t + \phi_0 \rfloor \text{ where,}$$

$$f_d = \frac{2v}{\lambda_0} \text{ (Doppler) and, } \phi_0 = 2\pi\left(\frac{2R_0}{\lambda_0}\right)$$

(Static two—way transmission phase)

The I-Ch and Q-Ch voltages represent a pulsed signal with amplitude proportional to object range and frequency in accordance object normal component of Doppler velocity. Subsequent analog signal processing encompasses amplification (130, 136) and low-pass filtering (132, 138) in accordance with the pulse width ($\tau_b$) and resolution and sampling rate of ADCs 134, 140.

Figure 5B:
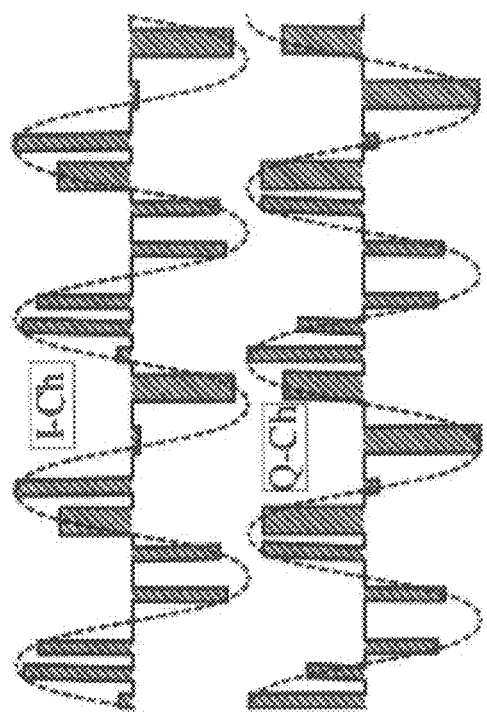
FIG. 5B includes schematic waveform diagrams of recovered I-channel and Q-channel waveforms in the presence of motion, i.e., the presence of Doppler, according to some exemplary embodiments.
Figure 5A:
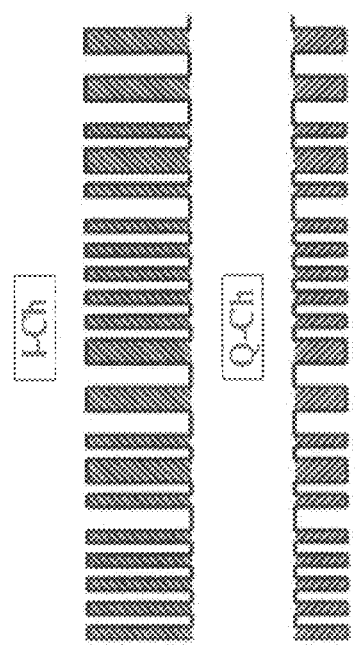
FIG. 5A includes schematic waveform diagrams of recovered I-channel and Q-channel waveforms in the absence of motion, i.e., the stationary or static case, according to some exemplary embodiments.

FIG. 5A includes schematic waveform diagrams of recovered I-channel and Q-channel waveforms in the absence of motion, i.e., the stationary or static case, according to some exemplary embodiments. FIG. 5B includes schematic waveform diagrams of recovered I-channel and Q-channel waveforms in the presence of motion, i.e., the presence of Doppler, according to some exemplary embodiments. In the static environment, e.g., no relative motion between LiDAR sensor and object(s), illustrated in FIG. 5A, there is no Doppler component and the I-Ch and Q-Ch outputs are constant amplitude pulses. In contrast, as illustrated in FIG. 5B, when relative motion is present between the LiDAR system and objects, the I-Ch and Q-Ch outputs incur AM modulation in accordance with the Doppler frequency envelope, illustrated in dashed lines in FIG. 5B. That is, Doppler frequency is contained within the I/Q samples of the recovered PCM envelope. It is noted from FIG. 5B that the PPM effectively "staggers" the Doppler samples which spreads the spectrum and degrades resolution. Under Doppler processing according to the present disclosure, the homodyne processing or "mixing" applies amplitude modulation to the I-Ch and Q-Ch signals for moving target objects. A complex FFT may be executed on each sequential range bin data set. This requires FFT execution at each range bin. An alternate approach uses range detection and a threshold test or threshold detection. Threshold detection is a technique used in radar signal detection to determine if a signal is present within the combined signal and noise at the receiver output, usually after a single pulse or multiple pulses have been acquired from a specific spatial location such as a range bin at a specific bearing angle. Threshold detection is typically performed prior to FFT execution, thereby executing FFT only on range bins with known detected signals, which reduces the processing load by reducing the number of FFT algorithm executions.

Figure 6B:
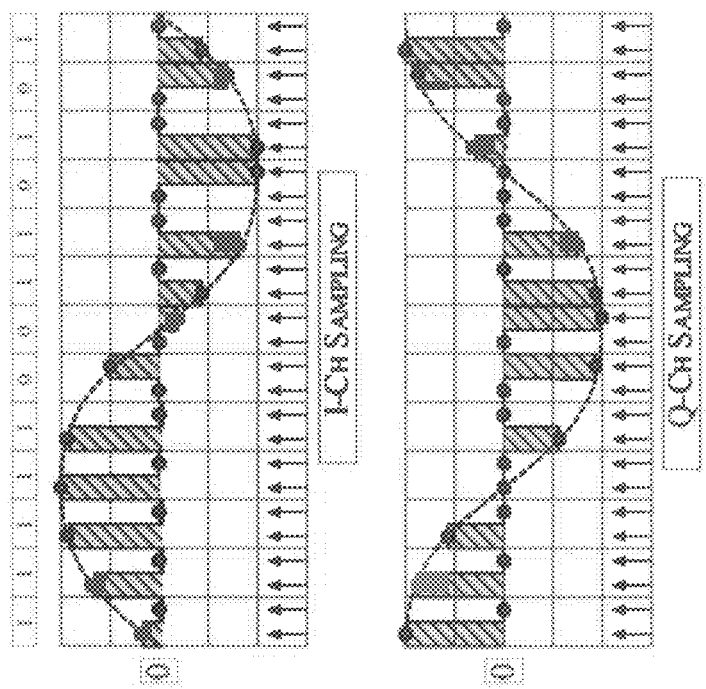
FIG. 6B includes schematic waveform diagrams illustrating data sampling of recovered I-channel and Q-channel waveforms in the presence of motion, i.e., the presence of Doppler, according to some exemplary embodiments.
Figure 6A:
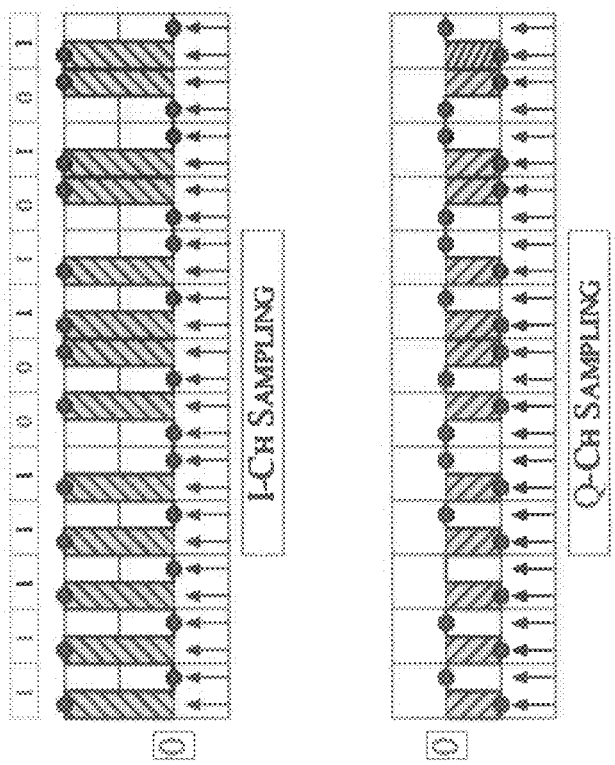
FIG. 6A includes schematic waveform diagrams illustrating data sampling of recovered I-channel and Q-channel waveforms in the absence of motion, i.e., the stationary or static case, according to some exemplary embodiments.

FIG. 6A includes schematic waveform diagrams illustrating data sampling of recovered I-channel and Q-channel waveforms in the absence of motion, i.e., the stationary or static case, according to some exemplary embodiments. FIG. 6B includes schematic waveform diagrams illustrating data sampling of recovered I-channel and Q-channel waveforms in the presence of motion, i.e., the presence of Doppler, according to some exemplary embodiments. Data acquisition encompasses ADC 134, 140 sampling of the I-Ch and Q-Ch signals, respectively, at a rate consistent with the pulse width, i.e. chirp, width ($\tau_b$) of the modulation code. According to the exemplary embodiments, the sampling frequency of ADCs 134, 140, $f_s$ is given by $f_s = 1/\tau_b$, as illustrated in FIGS. 6A and 6B. It will be noted that 26 samples are used to acquire the data set for a single range bin. A single range bin width, also referred to as the range measurement resolution, is defined by the equation:

$$\delta R = \frac{c\tau_b}{2}$$

where c is the speed of light, and $\tau_b$ is the pulse width.

Figure 7:
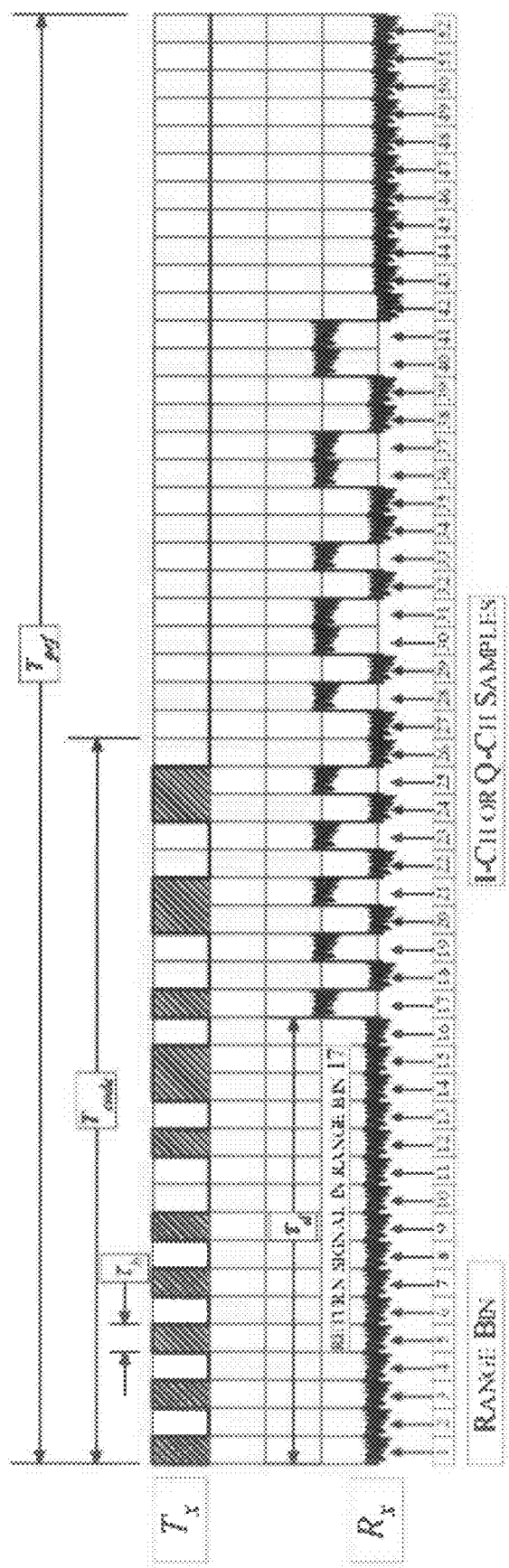
FIG. 7 includes a schematic waveform diagram illustrating data acquisition for sliding correlator implementation, according to some exemplary embodiments.
Figure 6:
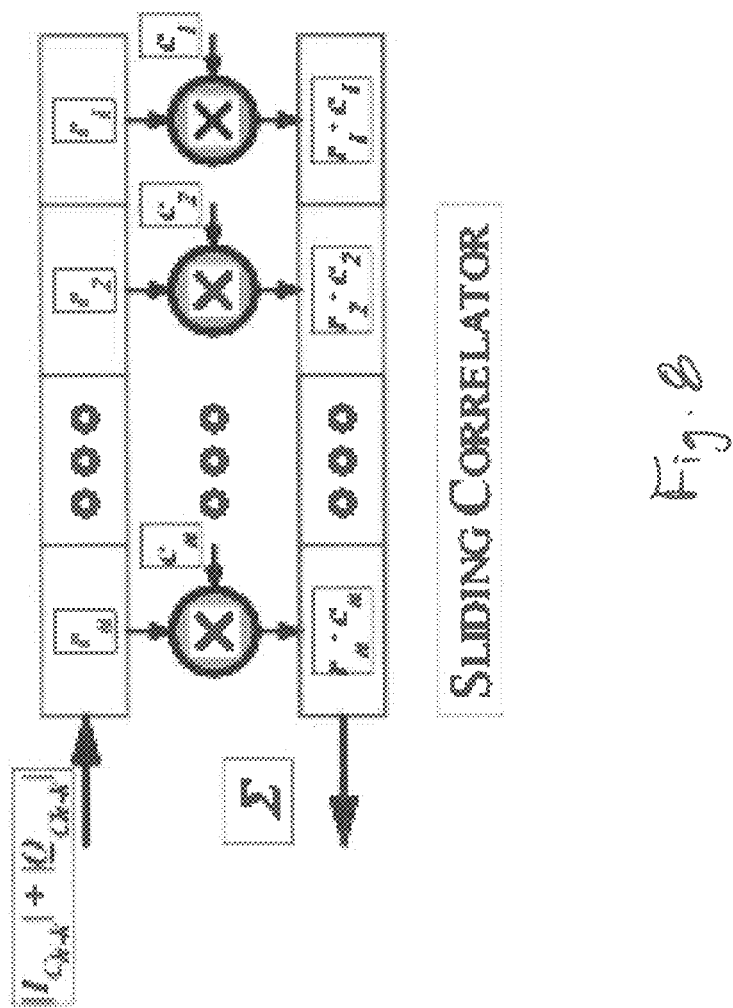

FIG. 7 includes a schematic waveform diagram illustrating data acquisition for sliding correlator implementation, according to some exemplary embodiments. Continuing to describe in detail the data acquisition process and subsequent signal processing according to the present disclosure, reference is made to FIG. 7, in which a transmit $T_x$ code is indicated in the top trace and an illustrative demodulated I-Ch or Q-Ch signal return $R_x$ from range bin 17 is illustrated in the lower trace. The ADC sample points are indicated by the arrows below the return signal. The 52-point data set, acquired following each transmission of the coded $T_x$ waveform from the ADC sampling, is used to interrogate each range bin previously defined via correlation with a stored replica of the transmit code. The range bins are interrogated in increments of 26-point data sets, consistent with code length correlation. The correlator is also referred to as a "sliding" correlator because, following acquisition of the 52-point data set, the magnitude sum of the respective I-Ch and Q-Ch values is multiplied by the stored replica values at each range bin and added. The result is then compared to a predetermined threshold to determine if an object is present in the interrogated range bin. The sliding correlator may be implemented numerically within DSP and control system 110, i.e., digital signal processor, and is similar in mathematical structure to a finite impulse response (FIR) filter. FIG. 8 includes a schematic diagram illustrating the mathematical structure of the sliding correlator, according to some exemplary embodiments. Referring to FIG. 8, the fixed amplitude of the return signal illustrated in FIG. 7 indicates that the object is stationary in range bin 17.

With reference to FIGS. 7 and 8, data is acquired at each range bin and correlated with the receive code on a range-in-by-range-bin basis. The receive code may dwell for increased processing gain. Data acquired from each range bin is incrementally shifted and multiplied by the stored code coefficients ($c_n$). The process effectively integrates the received energy. Magnitudes of the I-Ch and Q-Ch signals are used due to Doppler modulation.

An exemplary illustration of the structural and operational parameters of one approach to range processing for the PCM homodyne LiDAR transceiver, according to the present disclosure. Table 1 summarizes the conditions and parameters for the range processing operational exemplary illustration. In the exemplary illustration, a length 13, pseudo-Barker transmit waveform will be utilized as described in detail above.

TABLE 1

Operational Example Parametric Values

| PARAMETER | SYMBOL | VALUE | UNIT | NOTE/COMMENT |
|---|---|---|---|---|
| Maximum range | $R_{max}$ | 390 | meter | |
| Transmit chip width | $\tau_b$ | $50.0 \cdot 10^{-9}$ | second | |
| Range resolution | $\delta R$ | 7.5 | meter | $\delta R = c\tau_b/2$ |
| Data set length | $N_{data}$ | 52 | — | Increase for longer range detection |
| Receive range bin data | $r_n$ | | | See FIG. IV-4-A |
| Correlation code coefficients | $c_n$ | | | See FIG. IV-4-B |

Figure 9A:
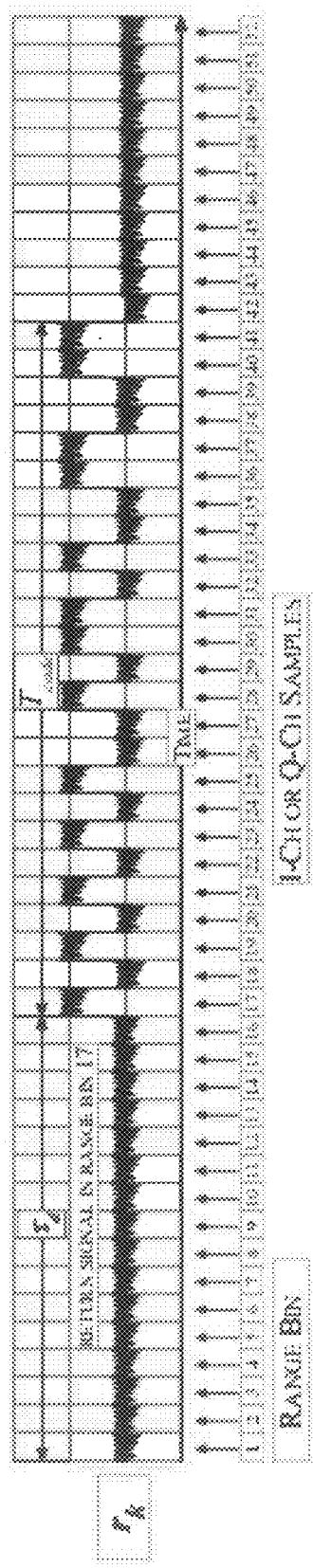
FIG. 9A includes a schematic diagram illustrating a return signal in either the I-channel or Q-channel, within range bin 17, according to some exemplary embodiments.
Figure 9B:
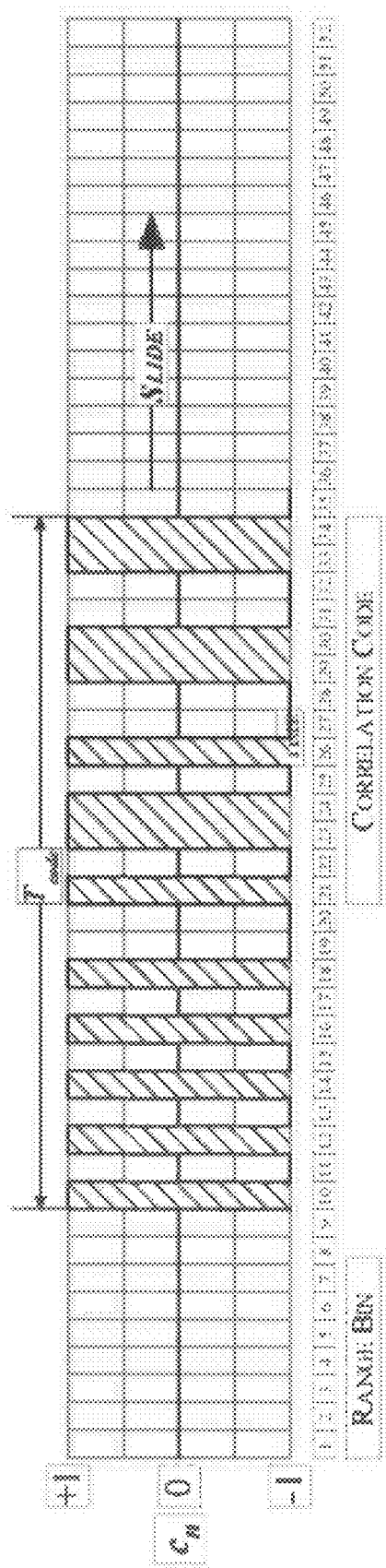
FIG. 9B includes a schematic waveform diagram illustrating the sliding correlator code signal, where the state of interrogation is in range bin 10, according to some exemplary embodiments.

FIG. 9A includes a schematic diagram illustrating a return signal in either the I-channel or Q-channel, within range bin 17, according to some exemplary embodiments. FIG. 9B includes a schematic waveform diagram illustrating the sliding correlator code signal, where the state of interrogation is in range bin 10, according to some exemplary embodiments. Referring to Table 1 and FIGS. 9A and 9b, the sliding correlator requires a code transmission burst for each range bin; therefore, there are 52 transmission code bursts, and the maximum range of detection is $R_{max}=N_{data} \cdot \delta R$, in this case, 390 meters. One should also be noted that a range cell dwell mode may be implemented via use of a stationary code at a single range bin. In addition to dwell mode, additional processing gain is available via use of a stationary code at a single range bin for several transmission bursts.

Figure 10:
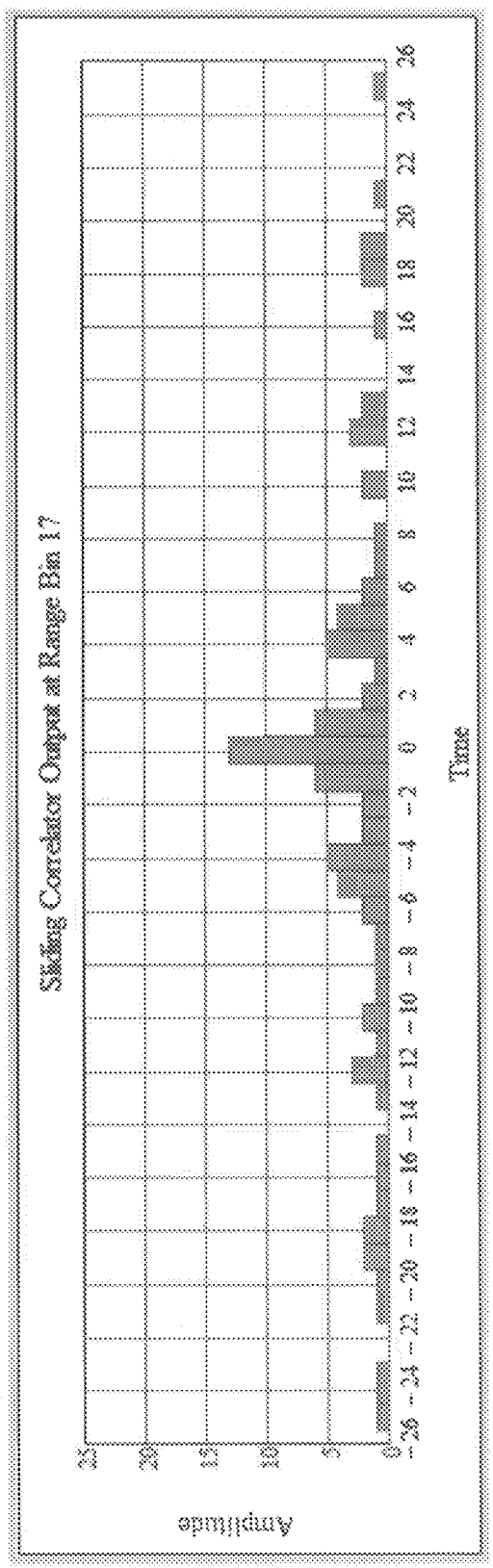
FIG. 10 includes a schematic illustration of the sliding correlator output for range bin 17, as referenced in connection with FIGS. 9A and 9B, according to some exemplary embodiments.

As noted above, FIG. 9A illustrates a return signal in either I-channel or Q-Channel within range bin 17, while the sliding correlator code is illustrated in FIG. 9B, where the state of interrogation is at range bin 10. The sliding correlator continues incrementally by range bin until the all range bins have been interrogated. FIG. 10 includes a schematic illustration of the sliding correlator output for range bin 17. As noted with reference to FIGS. 9A, 9B and 10, upon interrogation of range bin 17, the output of the sliding correlator illustrated in FIG. 10 indicates a peak representing the sum of the magnitude of the I-channel and Q-Channel signals. The processing gain of the sliding correlator may be ascertained from the resulting peak which represents the aggregate detected signal level from each pulse of the code:

$$PG_{dB} = 10 \cdot \text{Log}(n) = 11.1 \text{ dB}$$

Figure 11B:
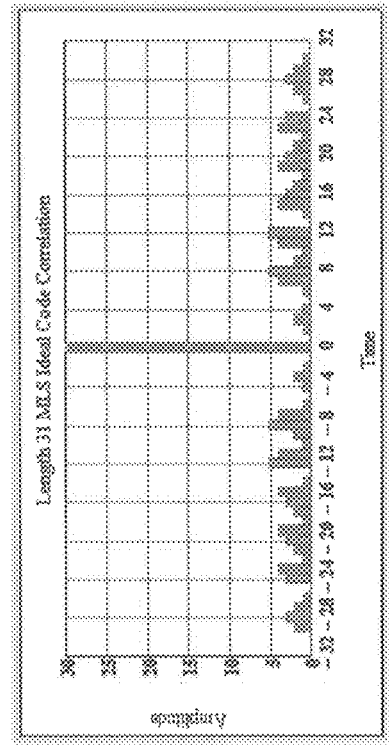
FIGS. 11A and 11B provide an illustration of the reduced sidelobe levels resulting from increasing the code length, according to some exemplary embodiments.
Figure 11A:
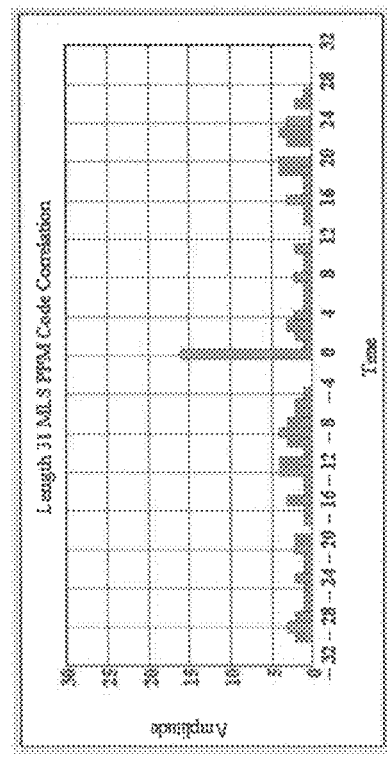

FIG. 10 also indicates a performance limitation as disclosed by the adjacent sideband levels. The sideband levels are significantly reduced by increasing the code length and optimization of the correlator code using a mismatched filter. FIGS. 11A and 11B provide an illustration of the reduced sidelobe levels resulting from increasing the code length. FIG. 11A includes a schematic diagram of length 31 maximum length sequence (MLS) pulse-position modulation (PPM) code correlation, according to some exemplary embodiments. FIG. 11B includes a schematic diagram of ideal length 31 MLS code correlation, according to some exemplary embodiments. Referring to FIGS. 10, 11A and 11B, a length 31 MLS code was utilized and modified in accordance with PPM criterion as previously described. The sliding correlator output for the PPM code and the ideal code are illustrated in FIGS. 11A and 11B, respectively. In addition to the sidelobe level differentiation, it should be noted that the processing gain is 3 dB higher in the case of the ideal code; this is a direct result of the reduced duty cycle (50%) associated with the PPM format.

With regard to correlation techniques discussed herein, the continuous and discrete state evaluations of the correlation function are mathematically defined by the correlation integral as set forth below. Specifically, the continuous state correlation equation (integral) is given by:

$$f(t) = x(t) \cdot y(t) = \int_a^b x(\lambda) \cdot y(\lambda + t) d\lambda;$$

and the discrete state correlation equation (summation) is given by:

$$f_n = (x * y)_n = \sum_{i=-\infty}^{\infty} \overline{x_i} \cdot y_{n-i}.$$

The 'i' index of 'y' produces a displacement of one increment in each sequential term of the summation. The bar over the 'x' term indicates the complex conjugate.

Figures 12A, 12B:
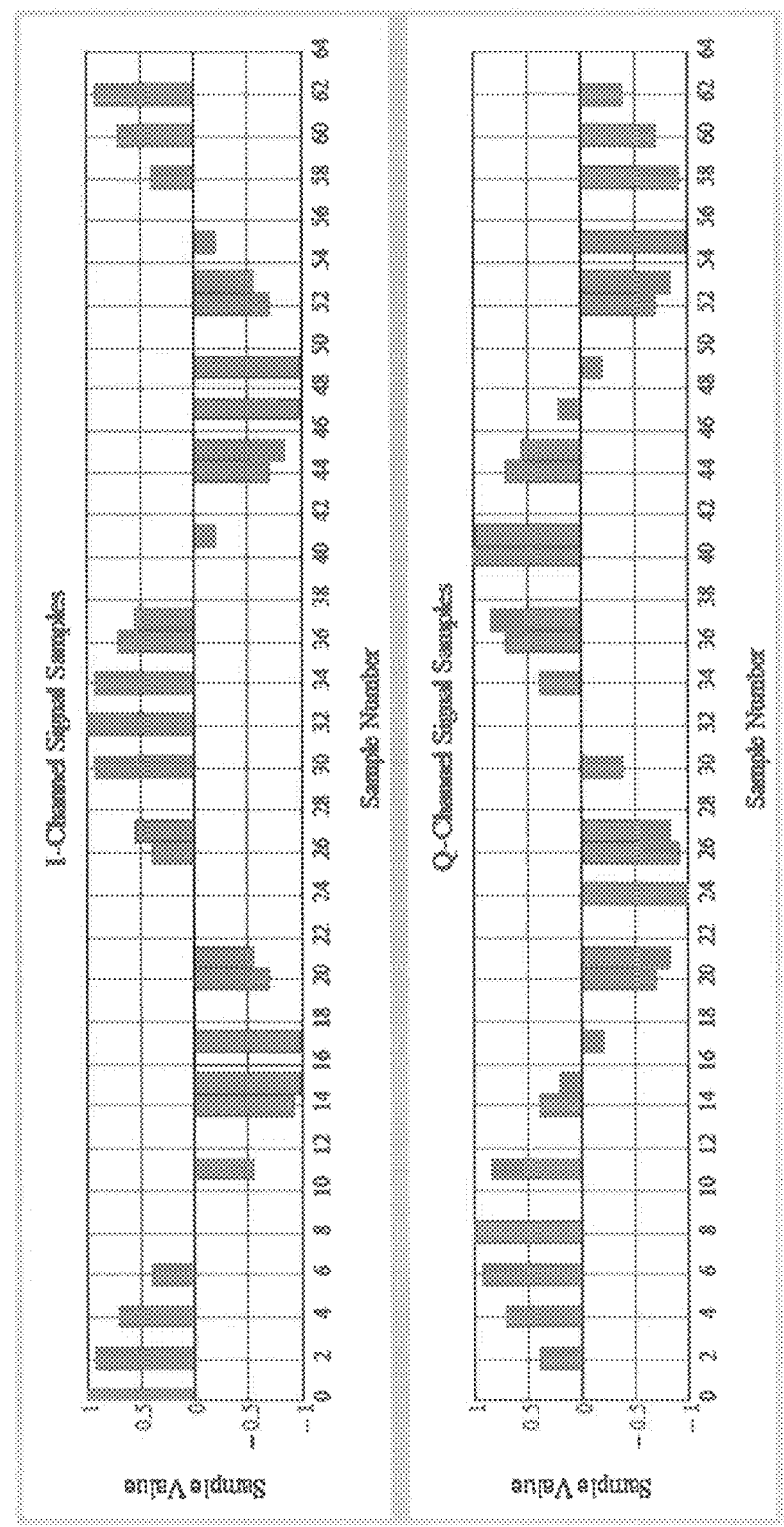
FIGS. 12A and 12B include schematic diagrams illustrating I-channel and Q-channel signal samples, respectively, of a moving target object at high signal-to-noise ratio (SNR), according to some exemplary embodiments.
Figure 13A:
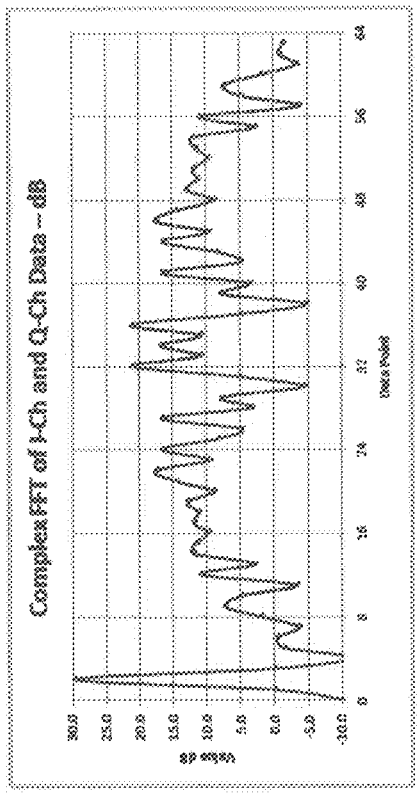
FIGS. 13A and 13B include schematic diagrams illustrating complex Fast Fourier Transform (FFT) of I-channel and Q-channel data plotted with linear amplitude and logarithmic amplitude, respectively, according to some exemplary embodiments.
Figure 13B:
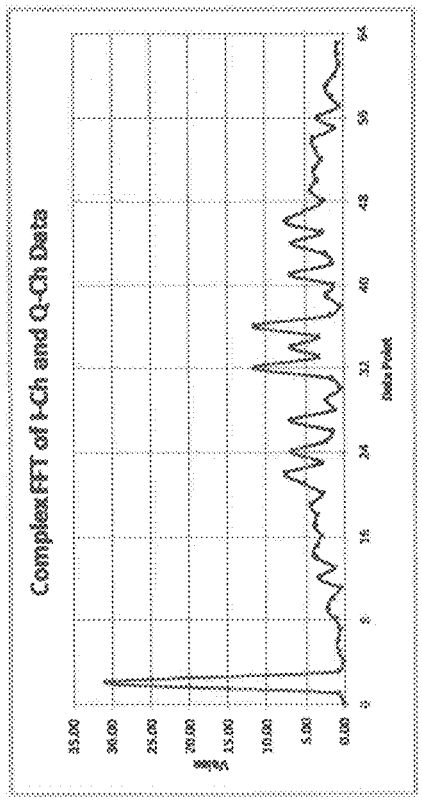
Figure 14A:
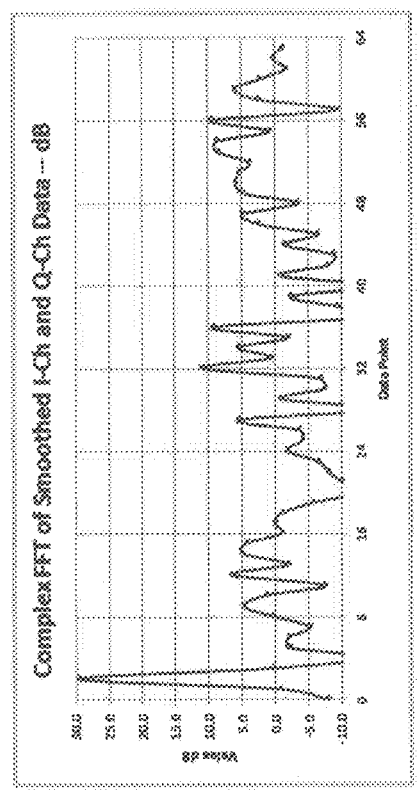
FIGS. 14A and 14B include schematic diagrams illustrating complex FFT of smoothed I-channel and Q-channel data plotted with linear amplitude and logarithmic amplitude, respectively, according to some exemplary embodiments.
Figure 14B:
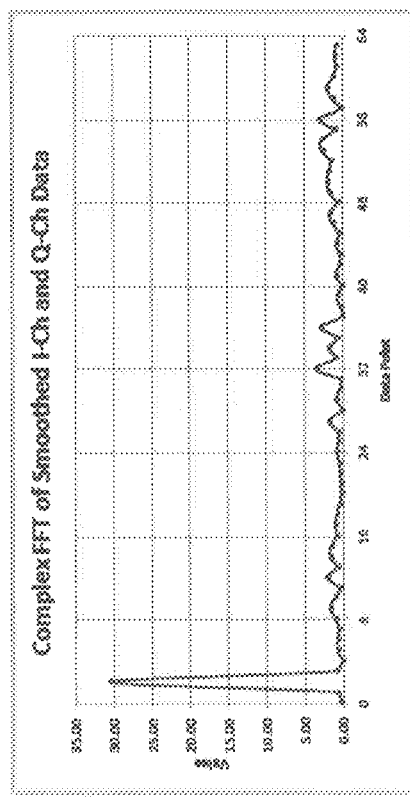

Doppler signal processing according to the present disclosure will now be described in detail. Unlike the direct detection NCPC LiDAR transceiver, which is not capable of Doppler detection, the NCPC homodyne LiDAR transceiver of the present disclosure is capable of Doppler detection. FIGS. 12A and 12B include schematic diagrams illustrating I-channel and Q-channel signal samples, respectively, of a moving target object 104 at high signal-to-noise ratio (SNR), according to some exemplary embodiments. FIGS. 13A and 13B include schematic diagrams illustrating complex Fast Fourier Transform (FFT) of I-channel and Q-channel data plotted with linear amplitude and logarithmic amplitude, respectively, according to some exemplary embodiments. FIGS. 14A and 14B include schematic diagrams illustrating complex FFT of smoothed I-channel and Q-channel data plotted with linear amplitude and logarithmic amplitude, respectively, according to some exemplary embodiments. FIGS. 13A and 13B illustrate spectral analysis of the I-channel and Q-channel data sets, and FIGS. 14A and 14B illustrate spectral analysis of the I-channel and Q-channel data sets with data smoothing. The Doppler detection process of the present disclosure is described with reference to FIGS. 12A, 12B, 13A, 13B, 14A and 14B. Referring to the I-channel and Q-Channel signals of FIGS. 12A and 12B, where the stationary and moving object graphics are illustrated, Doppler processing initially encompasses range bin object detection, followed by Doppler processing using spectral analysis of the sampled range bin data. It is noted that the number of points in the data set and the code length for a single range bin determine the Doppler frequency measurement resolution.

The diagrams of FIGS. 12A and 12B illustrate samples of the I-channel and Q-Channel signals for a moving object at a specific range bin using a pseudo-MLS code of 31 bits, modified in accordance with the PPM criterion described in detail above. With respect to the diagrams of FIGS. 13A and 13B, a single sample has been acquired for each bit of the code, and therefore the sample rate is $f_s=1/\tau_b$. The results of a complex spectral analysis, i.e., Fourier Transform, of the I-channel and Q-Channel data set is graphically illustrated in FIGS. 14A and 14B, where the peak signal is located in frequency bin-2. It is noted that the Doppler analysis is specific to a single range bin data set. A peak value search is sufficient for the object velocity measurement associated with the range bin data set.

It is noted that several side-lobes of the spectral analysis are significant in value when compared to the peak value. The high side-lobe levels are the direct result of code position sampling with no signal content. Side-lobe level reduction may be achieved via implementation of a data smoothing approach as demonstrated in the diagrams of FIGS. 14A and 14B, where a three point moving average has been applied to the data set prior to execution of the spectral analysis.

Doppler processing will now be further described by means of description of a Doppler processing example. Table 2 lists parameter values for the Doppler processing example. If the bit width ($\tau_b$) is 10 nsec, the sample rate is 100 MSPS and the code length is $T_{code}=N_{data}\cdot\tau_b$; or 0.62 μsec. Note that there are approximately two cycles of the Doppler signal contained within the code length. Table 2 includes a parametric summary of the Doppler frequency/velocity calculation.

TABLE 2

Doppler Example Parametric Values

| PARAMETER | SYMBOL | VALUE | UNIT | NOTE/COMMENT |
|---|---|---|---|---|
| Code length - bits | $N_{data}$ | 62 | bits | Pseudo-MLS - length 31 |
| Transmit chip width | $\tau_b$ | $10.0 \cdot 10^{-9}$ | second | |
| Code length - time | $T_{code}$ | $0.62 \cdot 10^{-6}$ | second | $T_{code} = N_{data} \cdot \tau_b$ |
| Sample rate | $f_s$ | 100 | MSPS | $f_s = 1/\tau_b$ |
| Doppler resolution | $\delta f_D$ | 1.61 | MHz | $\delta f_D = f_s/N_{data}$ [ ] |
| Operating wavelength | $\lambda_o$ | 1.0 | um | |
| Doppler frequency rate | $f_{D\_rate}$ | 2.0 | MHz/m/s | $f_D = 2 \cdot v/\lambda_o$ [ ] @ v = 1.0 m/s |
| Max Doppler frequency | $f_{D\_max}$ | 50 | m/s | $f_{D\_max} = f_s/f_{D\_rate}$ |
| Signal processing gain | $PG_{dB}$ | 14.9 | dB | $PG_{dB} = 10 \cdot Log(N_{data}/2)$ |

From the parametric data of Table 2 and the spectral analysis of FIGS. 13A, 13B, 14A, and 14B, where the peak is located in frequency bin 2, the Doppler frequency is 3.22 MHz (2·$\delta f_D$), or 1.61 m/s. A longer code at the same bit width ($\tau_b$), provides greater Doppler frequency measurement resolution, greater signal processing gain and lower sideband levels upon execution of the correlation function. However, the code length is restricted by the requirement that the object remain within the range resolution cell for the entire data acquisition interval; otherwise the processing gain is reduced. It is noted also that additional processing gain is achieved for moving objects due to the noise reduction bandwidth of the spectral processing of the Fourier Transform.

Table 3 represents a summary of parametric values for the PCM homodyne transceiver of the present disclosure consistent with a typical road vehicle application.

TABLE 3

Doppler Example Parametric Values

| PARAMETER | SYMBOL | VALUE | UNIT | NOTE/COMMENT |
|---|---|---|---|---|
| Code length-bits | $N_{data}$ | 1024 | bits | |
| Transmit chip width | $\tau_b$ | $10.0 \cdot 10^{-9}$ | second | |
| Code length-time | $T_{code}$ | $10.24 \cdot 10^{-6}$ | second | $T_{code} = N_{data} \cdot \tau_b$ |
| Sample rate | $f_s$ | 100 | MSPS | $f_s = 1/\tau_b$ [ ] one sample per range bin |
| Range resolution | $\delta R$ | 1.5 | meter | $\delta R = c \cdot \tau_b/2$ |
| Unambiguous range | $R_{unamb}$ | 1536 | meter | $R_{unamb} = c \cdot T_{code}/2$ |
| Detection range | $R_{det}$ | TBD | meter | |
| Operating wavelength | $\lambda_o$ | 1.0 | um | |
| Doppler frequency rate | $f_{D\_rate}$ | 2.0 | MHz/m/s | $f_D = 2 \cdot v/\lambda_o$ [ ] @ v = 1.0 m/s |
| Max Doppler frequency | $f_{D\_max}$ | 50 | m/s | $f_{D\_max} = f_s/f_{D\_rate}$ |
| Doppler resolution | $\delta f_D$ | 97.6 | KHz | $\delta f_D = f_s/N_{data}$ [ ] |

TABLE 3-continued

Doppler Example Parametric Values

| PARAMETER | SYMBOL | VALUE | UNIT | NOTE/COMMENT |
|---|---|---|---|---|
| Data acquisition time | $T_{acq}$ | $20.1 \cdot 10^{-3}$ | second | $= 2 \cdot (N_{data})^2 \cdot \tau_b = 2 \cdot N_{data} \cdot T_{code}$ |
| Signal processing gain | $PG_{dB}$ | 27.1 | dB | $PG_{dB} = 10 \cdot Log(N_{data}/2)$ |
| Signal processing gain (Doppler) | $PG_{dB\_D}$ | 30.1 | dB | $= 10 \cdot Log(N_{data}/\tau_b \cdot f_s)$ |

Figure 15:
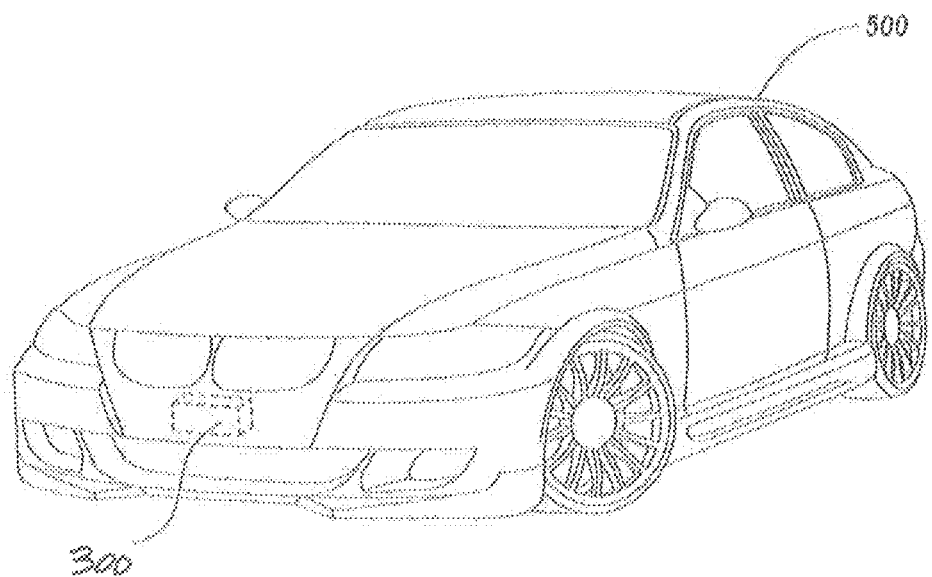
FIG. 15 includes a schematic perspective view of an automobile, equipped with one or more LiDAR systems equipped with the LiDAR transceiver described herein in detail, according to some exemplary embodiments.

FIG. 15 includes a schematic perspective view of an automobile 500, equipped with one or more LiDAR systems 300, equipped with the LiDAR transceiver 100 described herein in detail, according to some exemplary embodiments. Referring to FIG. 15, it should be noted that, although only a single scanning LiDAR system 300 is illustrated, it will be understood that multiple LiDAR systems 300 according to the exemplary embodiments can be used in automobile 500. Also, for simplicity of illustration, scanning LiDAR system 300 is illustrated as being mounted on or in the front section of automobile 500. It will also be understood that one or more scanning LiDAR systems 300 can be mounted at various locations on automobile 500.

Figure 16:
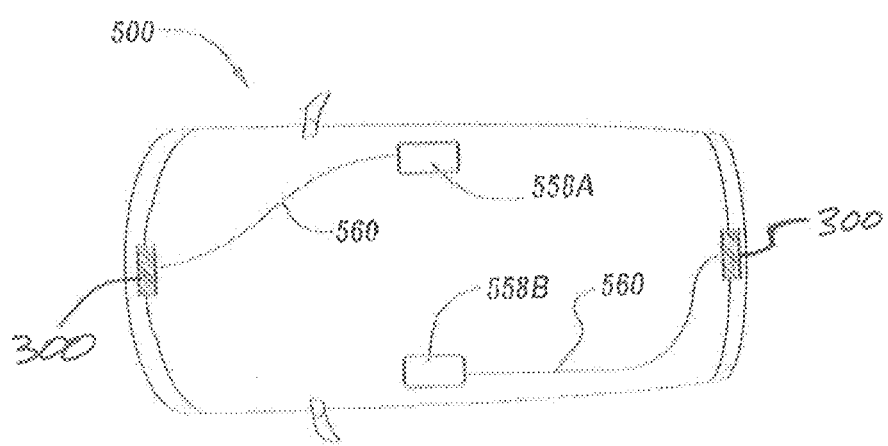
FIG. 16 includes a schematic top view of automobile equipped with two LiDAR systems, according to some exemplary embodiments.

FIG. 16 includes a schematic top view of automobile 500 equipped with two LiDAR systems 300, according to some exemplary embodiments. In the particular embodiments illustrated in FIG. 16, a first LiDAR system 300 is connected via a bus 560, which in some embodiments can be a standard automotive controller area network (CAN) bus, to a first CAN bus electronic control unit (ECU) 558A. Detections generated by the LiDAR processing described herein in detail in LiDAR system 300 can be reported to ECU 558A, which processes the detections and can provide detection alerts via CAN bus 560. Similarly, in some exemplary embodiments, a second LiDAR scanning system 300 is connected via CAN bus 560 to a second CAN bus electronic control unit (ECU) 558B. Detections generated by the LiDAR processing described herein in detail in LiDAR system 300 can be reported to ECU 558B, which processes the detections and can provide detection alerts via CAN bus 560. It should be noted that this configuration is exemplary only, and that many other automobile LiDAR configurations within automobile 500 can be implemented. For example, a single ECU can be used instead of multiple ECUs. Also, the separate ECUs can be omitted altogether.

It is noted that the present disclosure describes one or more LiDAR systems installed in an automobile. It will be understood that the embodiments of LiDAR systems of the disclosure are applicable to any kind of vehicle, e.g., bus, train, etc. Also, the scanning LiDAR systems of the present disclosure need not be associated with any kind of vehicle.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A LiDAR system, comprising:
an optical source for generating a continuous wave (CW) optical signal;
a control processor for generating a pulse-position modulation (PPM) signal;
an amplitude modulation (AM) modulator for receiving the CW optical signal and the PPM signal and generating therefrom a pulse-position amplitude-modulated optical signal;
a transmitter for transmitting the pulse-position amplitude-modulated optical signal through a transmit optical element into a region;
a receive optical element for receiving reflected versions of the pulse-position amplitude-modulated optical signal reflected from at least one target object in the region;
a first optical detector for receiving the CW optical signal from the optical source and a received version of the reflected versions of the pulse-position amplitude-modulated optical signal, and generating therefrom a first baseband signal;
a second optical detector for receiving the CW optical signal from the optical source and a received version of the reflected versions of the pulse-position amplitude-modulated optical signal, and generating therefrom a second baseband signal, wherein the second optical detector comprises a second mixer for generating the second baseband signal, wherein the first optical detector generates an in-phase-channel voltage signal, and the second optical detector generates a quadrature-channel voltage signal, and wherein the first and second baseband signals are in quadrature; and
a signal processor for receiving the first and second baseband signals and processing the first and second baseband signals to generate an indication related to the object.

2. The LiDAR system of claim 1, wherein the LiDAR system is a homodyne LiDAR system.

3. The LiDAR system of claim 1, wherein the LiDAR system is a heterodyne LiDAR system.

4. The LiDAR system of claim 1, wherein the first optical detector comprises a first mixer for generating the first baseband signal.

5. The LiDAR system of claim 1, wherein at least one of the first and second optical detectors comprises a phase shifter for introducing a phase difference between the first and second baseband signals.

6. The LiDAR system of claim 5, further comprising:
a first low-pass filter for filtering the in-phase-channel voltage signal to generate a filtered in-phase-channel voltage signal; and a second low-pass filter for filtering the quadrature-channel voltage signal to generate a filtered quadrature-channel voltage signal.

7. The LiDAR system of claim 6, further comprising:
a first analog-to-digital converter (ADC) for converting the in-phase-channel voltage signal to a digital in-phase-channel voltage signal; and
a second ADC for converting the quadrature-channel voltage signal to a digital quadrature-channel voltage signal.

8. The LiDAR system of claim 7, wherein the signal processor receives the first baseband signal and the second baseband signal and processes the first and second baseband signals to generate the indication related to the object.

9. The LiDAR system of claim 8, wherein the processor, in processing the first and second baseband signals to generate the indication related to the object, performs Doppler processing.

10. The LiDAR system of claim 8, wherein the processor, in processing the first and second baseband signals to generate the indication related to the object, performs correlation processing.

11. A LiDAR method, comprising:
generating a continuous wave (CW) optical signal;
generating a pulse-position modulation (PPM) signal;
generating a pulse-position amplitude-modulated optical signal from the CW optical signal and the PPM signal;
transmitting the pulse-position amplitude-modulated optical signal though a transmit optical element into a region;
receiving reflected versions of the pulse-position amplitude-modulated optical signal reflected from at least one object in the region;
mixing the CW optical signal from the optical source and the reflected versions of the pulse-position amplitude-modulated optical signal to generate therefrom a first baseband signal;
mixing the CW optical signal from the optical source and the reflected versions of the pulse-position amplitude-modulated optical signal to generate therefrom a second baseband signal;
performing phase shifting to introduce a phase difference between the first and second baseband signals, wherein the first and second baseband signals are in quadrature;
performing optical detection to generate an in-phase-channel voltage signal from the first baseband signal and a quadrature-channel voltage signal from the second baseband signal; and
processing the first and second baseband signals to generate an indication related to the object.

12. The LiDAR method of claim 11, wherein the LiDAR method is a homodyne LiDAR method.

13. The LiDAR method of claim 11, wherein the LiDAR method is a heterodyne LiDAR method.

14. The LiDAR method of claim 11, further comprising performing phase shifting to introduce a phase difference between the first and second baseband signals.

15. The LiDAR method of claim 14, further comprising:
low-pass filtering the in-phase-channel voltage signal to generate a filtered in-phase-channel voltage signal; and
low-pass filtering the quadrature-channel voltage signal to generate a filtered quadrature-channel voltage signal.

16. The LiDAR method of claim 15, further comprising:
converting the in-phase-channel voltage signal to a digital in-phase-channel voltage signal; and
converting the quadrature-channel voltage signal to a digital quadrature-channel voltage signal.

17. The LiDAR method of claim 16, wherein processing the first and second baseband signals to generate the indication related to the object comprises performing Doppler processing on the digital in-phase-channel voltage signal and the digital quadrature-channel voltage signal.

18. The LiDAR method of claim 16, wherein processing the first and second baseband signals to generate the indication related to the object comprises performing correlation processing on the digital in-phase-channel voltage signal and the digital quadrature-channel voltage signal.

* * * * *